US012792997B2

(12) United States Patent
Kuebler et al.

(10) Patent No.: US 12,792,997 B2
(45) Date of Patent: Nov. 10, 2026

(54) INDUSTRY LANGUAGE CONVERSATION

(71) Applicant: Oracle International Corporation, Redwood Shores, CA (US)

(72) Inventors: Juergen Kuebler, Centennial, CO (US); Andrei Dan Iosub, Buchare (RO); Thomas Edgar Henry, Franklinville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 526 days.

(21) Appl. No.: 17/722,223

(22) Filed: Apr. 15, 2022

(65) Prior Publication Data

US 2023/0123236 A1 Apr. 20, 2023

Related U.S. Application Data

(60) Provisional application No. 63/262,797, filed on Oct. 20, 2021.

(51) Int. Cl.
*G06Q 10/0639* (2023.01)

(52) U.S. Cl.
CPC .............................. *G06Q 10/06393* (2013.01)

(58) Field of Classification Search
CPC ................................................ G06Q 10/06393
USPC ......................................................... 705/7.11
See application file for complete search history.

(56) References Cited

U.S. PATENT DOCUMENTS

| | | | | |
|---|---|---|---|---|
| 6,931,387 | B1 | 8/2005 | Wong et al. | |
| 11,144,929 | B1 * | 10/2021 | Glenn | G06Q 30/016 |
| 11,595,243 | B1 * | 2/2023 | Schreiber | H04L 41/0816 |

(Continued)

FOREIGN PATENT DOCUMENTS

| | | | | |
|---|---|---|---|---|
| GB | 2469741 A | * 10/2010 | | G06Q 10/10 |
| KR | 10-2018-0029593 A | 3/2018 | | |
| KR | 10-2076657 B1 | 2/2020 | | |

OTHER PUBLICATIONS

Pham, Deep Triage: Automated Transfer Assistance for Incidents in Cloud Services, Nov. 25, 2020, https://arxiv.org/pdf/2012.03665, p. 1-9.*

(Continued)

*Primary Examiner* — Mehmet Yesildag
(74) *Attorney, Agent, or Firm* — Invoke

(57) ABSTRACT

Techniques are described for diagnosing, characterizing, and addressing problems across a variety of industry sectors. In some embodiments, a system receives information about a company or other entity and maps the information to different areas of operation that are relevant to the entity. The system may identify potential problems and root causes that degrade operations relevant to the entity. The system may further use a model to gauge how significant various sector-specific and/or sector-generic problems are for the entity. Additionally or alternatively, the system may compare the scores to benchmark models to determine how an entity is performing and progressing relative to other entities in the same sector and/or across different sectors. The techniques allow users to quickly assess the performance of an entity across several different areas of operation, isolate underperforming areas, identify the root causes, and deploy technical solutions to address underlying problems.

20 Claims, 21 Drawing Sheets

(56) References Cited

U.S. PATENT DOCUMENTS

| | | | | |
|---|---|---|---|---|
| 2010/0275054 | A1* | 10/2010 | Grace | G06Q 40/02 714/2 |
| 2014/0046879 | A1 | 2/2014 | Maclennan et al. | |
| 2014/0279718 | A1* | 9/2014 | Southey | G06N 5/022 706/11 |
| 2015/0186893 | A1* | 7/2015 | Kimble | G06Q 30/016 705/304 |
| 2017/0323211 | A1* | 11/2017 | Bencke | G06Q 10/00 |
| 2018/0137093 | A1 | 5/2018 | Goldfarb et al. | |
| 2020/0127812 | A1* | 4/2020 | Schuler | H04L 9/0637 |

OTHER PUBLICATIONS

"Automated Machine Learning", Retrieved at https://www.datarobot.com/wiki/automated-machine-learning/, Retrieved on Apr. 2022, pp. 5.

"Mapping AI techniques to problem types", Retrieved at https://www.mckinsey.com/industries/financial-services/our-insights/mapping-ai-techniques-to-problem-types, Retrieved on Apr. 2022, pp. 10.

"Translate a business problem into an AI and data science solution", Retrieved at https://www.ibm.com/garage/method/practices/discover/business-problem-to-ai-data-science-solution/, Retrieved on Apr. 2022, pp. 7.

* cited by examiner

700

Search    Cart (0)    Feedback

| Root Cause |
| --- |
| Fulfillment - "The ability to get every order correct and deliver it efficiently to the customer requires great execution while utilizing better technology than we have today" |
| Labor management - "Our stores need a way to better understand the labor requirements needed to serve our customers at curbside without diminishing the service levels of the in-store experience for our customers" |
| Training - "Our stores need to be trained on best practices for meeting this requirement for our customers to make a seamless experience that exceeds their expectations" |
| Delivery - "Customers are now expecting same-day deliver and in some cases, within 2 hours. We are constantly looking at ways to improve our ability to get the orders to our customers in the time we are promise and that our customers expect." |
| Demand forecasting - "We have been presented with new challenges for predicting demand based on the preferences the customer chooses to shop with us -- both online and in-store" |
| Fulfillment capabilities - "The ability to meet the customer's order perfectly is hampered by the fact that our stores were not designed to be fulfillment centers" |
| Integrated systems - "Our stores have relied on legacy systems built to support in-store shopping. We struggle with integrating all of our systems for flawless execution." |
| Product availability - "The explosion in e-commerce business has created challenges for us to ensure we can fill each customer order perfectly" |
| Access customer profile - "Inability to access customer profile from centralized customer data prevents retailers ability to offer a fluid experience" |
| Channel visibility - "Lack of visibility into same products across channels" |

A B

FIG. 7 (Continued-1)

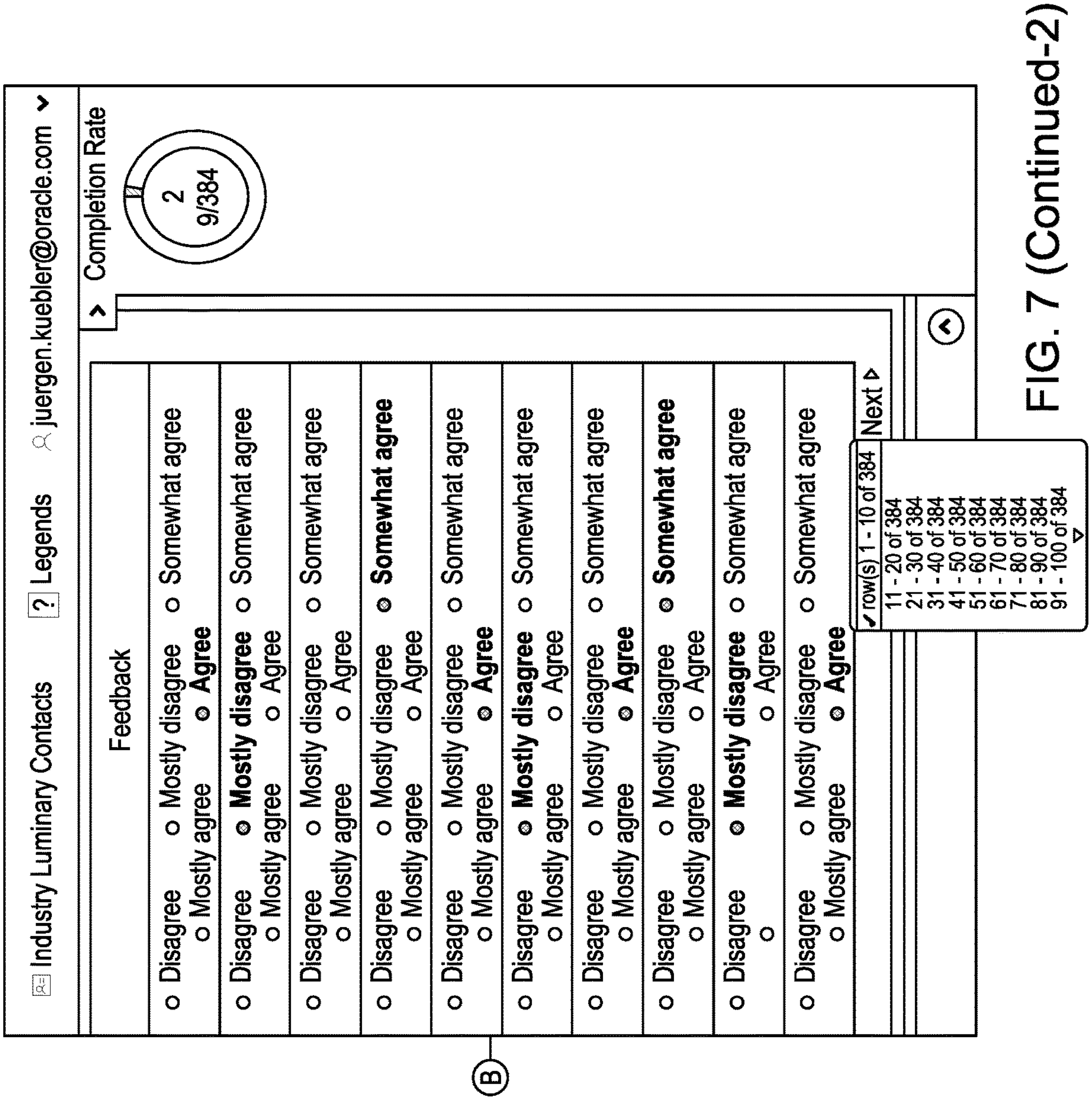
FIG. 7 (Continued-2)

900

INDUSTRY LANGUAGE CONVERSATION

INCORPORTION BY REFERENCE; DISCLAIMER

The following application is hereby incorporated by reference: application No. 63/262,797 filed on Oct. 20, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to systems and methods for providing real-time guidance to diagnose and address problematic areas of operation associated with an entity.

BACKGROUND

Businesses and other organizations often face a variety of problems across several different areas of operation. For example, an organization may suffer from sub-optimal performance in information technology, supply chain management, industrial manufacturing, customer relationship management, and/or talent acquisition, among several other areas. Due to the complex nature and scale of industrial operations, it may be difficult for organizations to efficiently isolate and address the root causes of problems. A failure to correct a problem in a timely manner may compound into additional problems down the road, negatively impacting the overall operations of an enterprise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
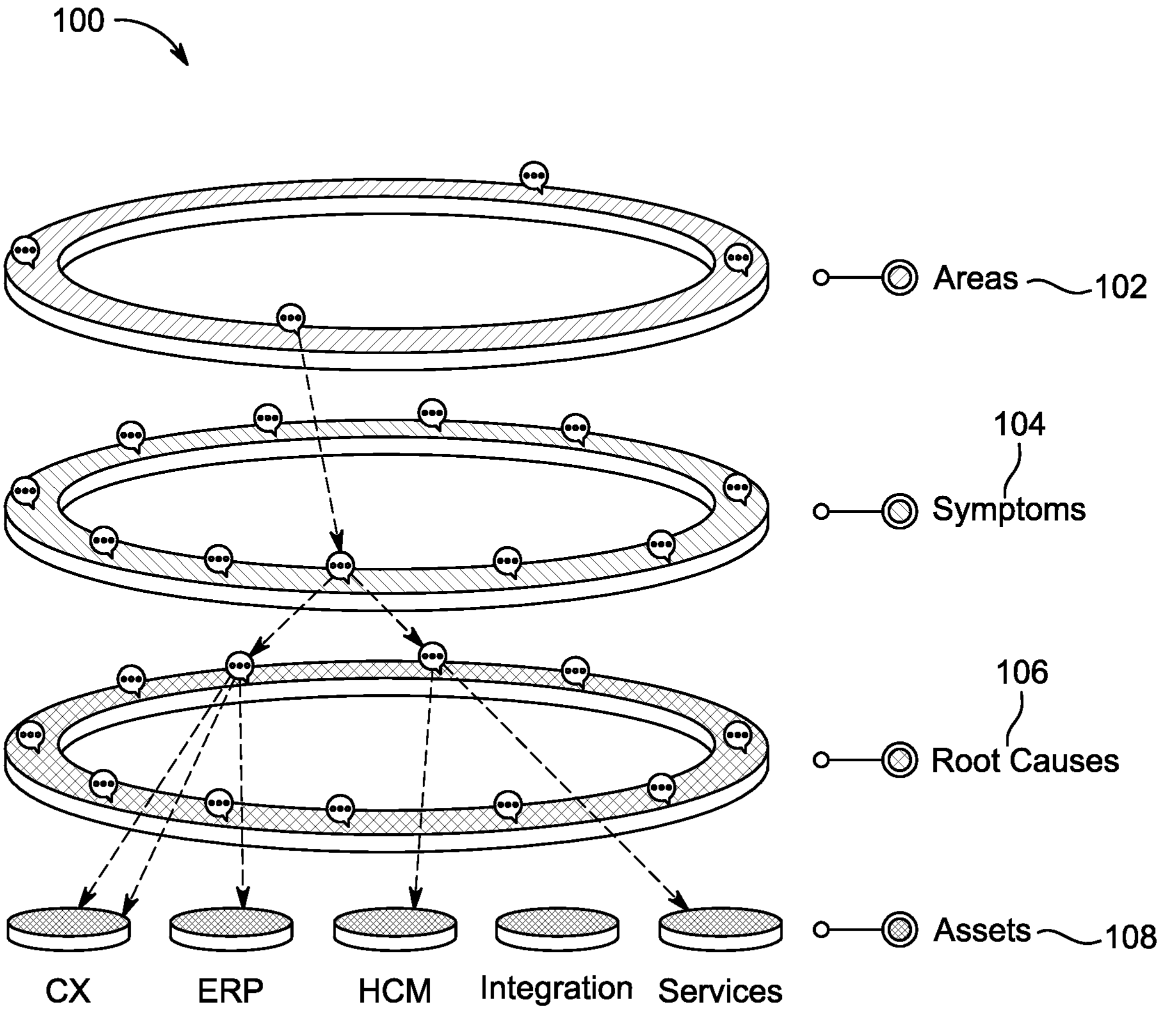
FIG. 1 illustrates an example data model for industry language conversation services in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INDUSTRY LANGUAGE CONVERSATION SYSTEM ARCHITECTURE
3. INDUSTRY LANGUAGE CONVERSATIONS AND ASSESSMENTS
   - 3.1 PROCESS OVERVIEW
   - 3.2 EXAMPLE CONVERSATIONAL INTERFACE FLOW
   - 3.3 SHOPPING CART INTERFACE
   - 3.4 QUESTIONNAIRE INTERFACE
   - 3.5 ASSESSMENT SCORES AND VISUALIZATIONS
   - 3.6 BENCHMARK COMPARISONS
   - 3.7 ASSESSMENT-TRIGGERED ACTIONS
4. ARTIFICIAL INTELLIGENCE, MACHINE LEARNING, AND DEEP LEARNING APPLICATIONS
5. BLOCKCHAIN APPLICATIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. GENERAL OVERVIEW

Techniques are described herein for diagnosing, characterizing, and addressing large-scale sector-specific and sector-generic problems across a variety of industry sectors. In some embodiments, a system receives information about a company or other entity and maps the information to different areas of operation that are relevant to the entity. The system may identify potential problems and root causes that degrade operations engaged in by the entity. The system may further use a model for generating scores to gauge how significant various sector-specific and/or sector-generic problems are for the entity. Additionally or alternatively, the system may compare the scores to benchmark models to determine how an entity is performing and progressing relative to other entities in the same sector and/or across different sectors. The techniques allow users to quickly assess the performance of an entity across several different areas of operation, isolate underperforming areas, identify the root causes, and deploy technical solutions to address underlying problems.

Embodiments described herein further include techniques for building a data repository of root problems. The data repository may structure data in a manner that facilitates interactions using sector-specific language across several different industries. Users that are not familiar with the language of an industry may leverage the structured data to become conversant with industry experts. For example, the system may traverse the structured data in a way that provides users with real-time and ad-hoc guidance while engaged in a live conversation. The system may record and report feedback from such interactions, which may be used to refine the data repository and guidance to enhance future interactions.

Embodiments described herein further include techniques for performing digital transformation assessments. The system may recommend software, cloud services, and/or other resources for addressing problematic areas of operations through digital transformations and/or other means. Additionally or alternatively, the system may track changes relative to performance benchmarks as entities deploy digital transformation solutions. The system may assess what impact, if any, changes to an entity's systems and processes have across various areas of operations. The system may further learn and recommend solutions that were successful for entities with similar problems.

In some embodiments, software applications, cloud services, blockchain programs, artificial intelligence (AI) engines, machine-learning models and/or other systems may consume industry language conversation outputs, including assessments, to enhance or enable certain functions. For example, a blockchain network may run a smart contract only if the assessment satisfies a set of predetermined criteria or may execute different blockchain transactions based on one or more assessment values. As another example, a machine-learning (ML) engine may train one or more ML models to learn patterns that lead to better assessments. The ML engine may apply the ML model to predict whether digital transformation solutions, including software applications and cloud services, will improve an entity's performance in one or more areas of operation.

One or more embodiments described in this Specification and/or recited in the claims may not be included in this General Overview section.

2. INDUSTRY LANGUAGE CONVERSATION SYSTEM ARCHITECTURE

FIG. 1 illustrates an example data model for industry language conversation services in accordance with some embodiments. Data model 100 is multilayered, which may help optimize and mask the underlying complexity of providing real-time guidance across various sectors. Each layer may comprise a set of elements assigned to a cluster, relational database table, or some other data structure. Data model 100 may define a hierarchical relationship between the different layers, where intra-layer relationships correspond to different industry language conversation flows and inter-layer relationships correspond to a related industry language conversation flow.

Area layer 102 is the topmost layer within data model 100 and includes a set of nodes representing different topics of conversation around which industry language conversations may center. For example, different nodes in area layer 102 may correspond to different areas of operation, industries, or sectors. Different nodes may encapsulate distinct attributes, relationships, and/or language that are specific to a corresponding area.

Data model 100 defines links between the nodes in area layer 102 and nodes in symptoms layer 104. A link between a node in area layer 102 and symptoms layer 104 establishes a hierarchical relationship between an area and a symptom. Data model 100 may link each area node to a distinct set of one or more symptom nodes A linked symptom may represent features indicative of a problem associated with the area. For example, a symptom may represent underperformance in a particular operation and/or metric associated with an area to which the symptom is linked.

Data model 100 further defines links between nodes in symptoms layer 104 and nodes in root cause layer 106. A link between a node in symptoms layer 104 and root cause layer 106 establishes a relationship between a root cause and a symptom. The link further establishes a hierarchical relationship with the area node linked to the parent symptom node. Data model 100 may link each symptom node to a distinct set of one or more root cause nodes. A root cause may represent a possible underlying reason a symptom is exhibited. For example, a root cause may include a rationale for sub-optimal performance detected for a particular operation.

Data model 100 further defines links between nodes in root cause layer 106 and asset layer 108. A link between a node in root cause layer 106 and asset layer 108 establishes a relationship between an asset and a root cause. The link further establishes a hierarchical relationship with the area node and symptom node that are linked to the parent root cause node. Data model 100 may link each root cause node to a distinct set of one or more asset nodes. An asset node may represent a possible technical solution to address a root cause. For example, a symptom may identify a software application or service that may be deployed to optimize a process or correct a problem.

Data model 100 may include a significant number of root cause nodes across several different sectors, industries, and areas of operations. Based on how data model 100 structures the data and links nodes, a system may quickly identify and present a reduced set of areas, symptoms, root causes, and/or assets on each screen within an application flow. Thus, software applications and services may leverage data model 100 to optimize application flows and user interface designs. Data model 100 may be used in a wide variety of applications as described further herein.

Figure 2:
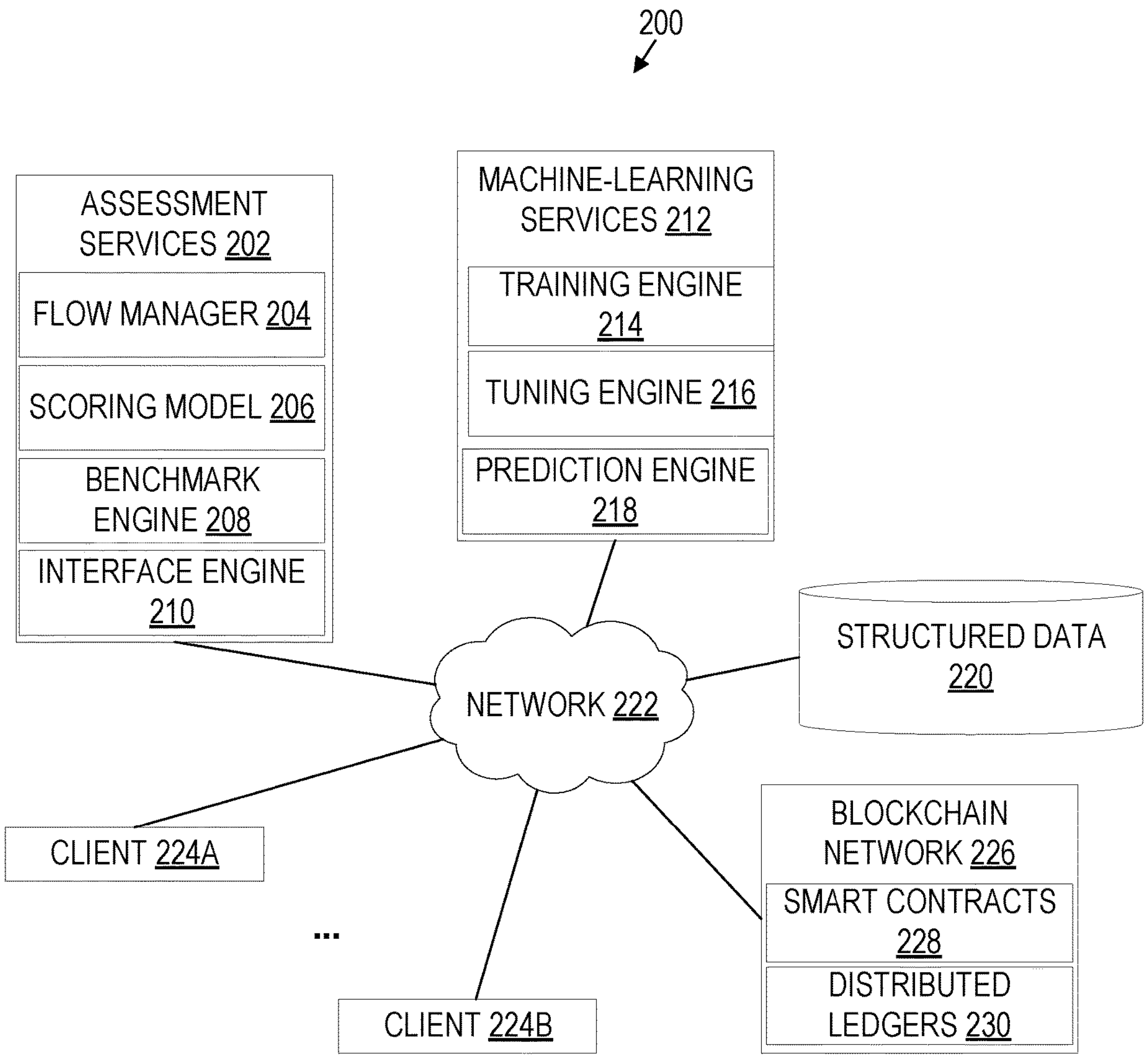
FIG. 2 illustrates an example system for managing industry language conversations in accordance with some embodiments.

FIG. 2 illustrates an example system for managing industry language conversations in accordance with some embodiments. As illustrated in FIG. 2, system 200 includes assessment services 202, machine-learning (ML) services 212, structured data 220, network 222, blockchain network 226, and clients 224*a-b*. System 200 may include more or fewer components than the components illustrated in FIG. 2. In some cases, the components illustrated in FIG. 2 may be local to or remote from each other. The components illustrated in FIG. 2 may be implemented in software and/or hardware. In some cases, an individual component may be distributed over multiple applications and/or machines and/or multiple components may be combined into one application and/or machine. Operations described with respect to one component may instead be performed by another component.

In some embodiments, assessment services 202 includes flow manager 204, scoring model 206, benchmark engine 208, and interface engine 210. Flow manger 204 may define application flows for providing real-time, ad-hoc guidance to users during live interactions. Flow manager 204 may traverse relationships between nodes within structured data 220 to manage the application flows, providing sector-specific guidance based on the areas, symptoms, and root causes that are relevant to a user.

In some embodiments, scoring model 206 assesses entities and generates one or more assessment scores. An assessment score may indicate a performance of the entity with respect to an area of operation, a magnitude for a symptom, or the likelihood that a root cause is degrading performance. Scoring model 206 may assess the performance of an entity in various areas of operation to highlight areas where an entity is performing well and/or areas where the entity is underperforming.

In some embodiments, benchmark engine 208 computes and tracks benchmark scores for areas, symptoms, and/or root causes. Entities may compare scores to benchmarks to evaluate performance relative to other entities within the same industry, sector, and/or sub-sector. Additionally or alternatively, performance may also be compared to entities across several different industries.

Interface engine 210 generates user interface components for interacting with assessment services 202. Example user interfaces may comprise, without limitation, a graphical user interface (GUI), an application programming interface (API), a command-line interface (CLI) or some other interface for accessing network resources. Interface engine 210 may serve interface components to client applications, including clients 224*a-b*, which may render the elements in a display. For example, a client may be a browser, mobile app, or application frontend that displays user interface elements for invoking industry language conversation flows or guidance through a GUI window. Examples of user interface elements include checkboxes, radio buttons, dropdown lists, list boxes, buttons, toggles, text fields, date and time selectors, command lines, sliders, pages, and forms.

Machine-learning (ML) services 212 implement self-learning algorithms that extrapolate outcomes and recommendations. ML services 212 may make inferences and adjustments during application runtime rather than relying on static instruction sets to perform tasks. Thus, system 200 may adapt in real-time to varying and evolving industry language conversation problems without requiring additional hard-coding to account for new patterns. In some embodiments, ML services 212 includes training engine 214 for training ML models, tuning engine 216 for adjusting ML model parameters and/or hyperparameters, and prediction engine 218 for applying trained ML models. Techniques for training, tuning, and applying ML models are described further in Section 4, titled Artificial Intelligence, Machine Learning, and Deep Learning Applications.

Structured data 220 may follow data model 100 and include data accessible to other components of system 200. In some embodiments, structured data 220 is stored in one or more data repositories, which may include volatile and/or non-volatile storage. Further, a data repository may include multiple different storage units and/or devices. Multiple different storage units and/or devices may or may not be of the same type or located at the same physical site. Further, structured data 220 may be stored in a data repository that is implemented or executed on the same computing system as one or more other components of system 200. Additionally or alternatively, structured data 220 may be stored in a data repository that may be implemented or executed on a computing system separate from other components of system 200.

Clients 224*a-b* may include client applications and/or devices that connect with other components of system 200 via network 222, such as assessment services 202 and ML services 212. Network 222 represents one or more interconnected data communication networks, such as the Internet. Clients may communicate over network 222 according to one or more communication protocols. Example communication protocols may include the hypertext transfer protocol (HTTP), simple network management protocol (SNMP), and other communication protocols of the internet protocol (IP) suite.

Blockchain network 226 comprises a set of nodes and services for managing smart contracts 228 and distributed ledgers 230. Blockchain network 226 may be a permissioned blockchain comprising a closed ecosystem where only invited organizations and individuals can join the network and keep a copy of a distributed ledger. Multiple peer nodes may maintain a copy of a distributed ledger. Transactions within blockchain network 226 may be added to distributed ledgers 230 and disseminated to other peer nodes according to a peer-to-peer or consensus protocol. For example, a transaction protocol may include an endorsement step whereby the transaction is accepted or rejected, an ordering step whereby transactions are sorted into a sequence of blocks, and a validation step whereby the endorsement is verified against endorsement and permission policies. Peer nodes may further maintain copies of smart contracts 228. Smart contracts 228, also referred to as chaincode, are programs that implement operations agreed to by members of blockchain network 226. Off-chain storage 232 may store smart contracts and/or records outside of a blockchain. Such data that is not stored within the distributed ledgers of a blockchain network may be referred to as off-chain data. Nodes within blockchain network 226 may maintain copies of distributed ledgers, which may store links to any off-chain data. Distributed ledgers 230 may reference and identify off-chain data using an on-chain hash for a block in the blockchain. Off-chain storage 232 allows for a slimmer blockchain layer, reducing storage overhead and providing more efficient blockchain transactions. Example blockchain implementations are described further below in Section 5, titled Blockchain Applications.

In some embodiments, one or more services of system 200 are exposed through a cloud service or a microservice. A cloud service may support multiple tenants, also referred to as subscribing entities. A tenant may correspond to a corporation, organization, enterprise or other entity that accesses a shared computing resource. Different tenants may be managed independently even though sharing computing resources. For example, different tenants may have different account identifiers, access credentials, identity and access management (IAM) policies, and configuration settings. Additional embodiments and/or examples relating to computer networks and microservice applications are described below in Section 6, titled Computer Networks and Cloud Networks, and Section 7, titled Microservice Applications.

3. INDUSTRY LANGUAGE CONVERSATIONS AND ASSESSMENTS

3.1 Process Overview

In some embodiments, clients 224*a-b* may interact with assessment services 202 to access real-time and ad-hoc guidance with respect to one or more entities. The assessment process may follow a logical progression, based on the structured data, to isolate underperforming areas, identify the root causes, and recommend technical solutions to address underlying problems. The assessment process may tailor the guidance using industry and sector-specific language based on the progression of a user interaction. Users may leverage the guidance to provide technical support and/or otherwise converse using sector-specific terminology across several different industries.

Figure 3:
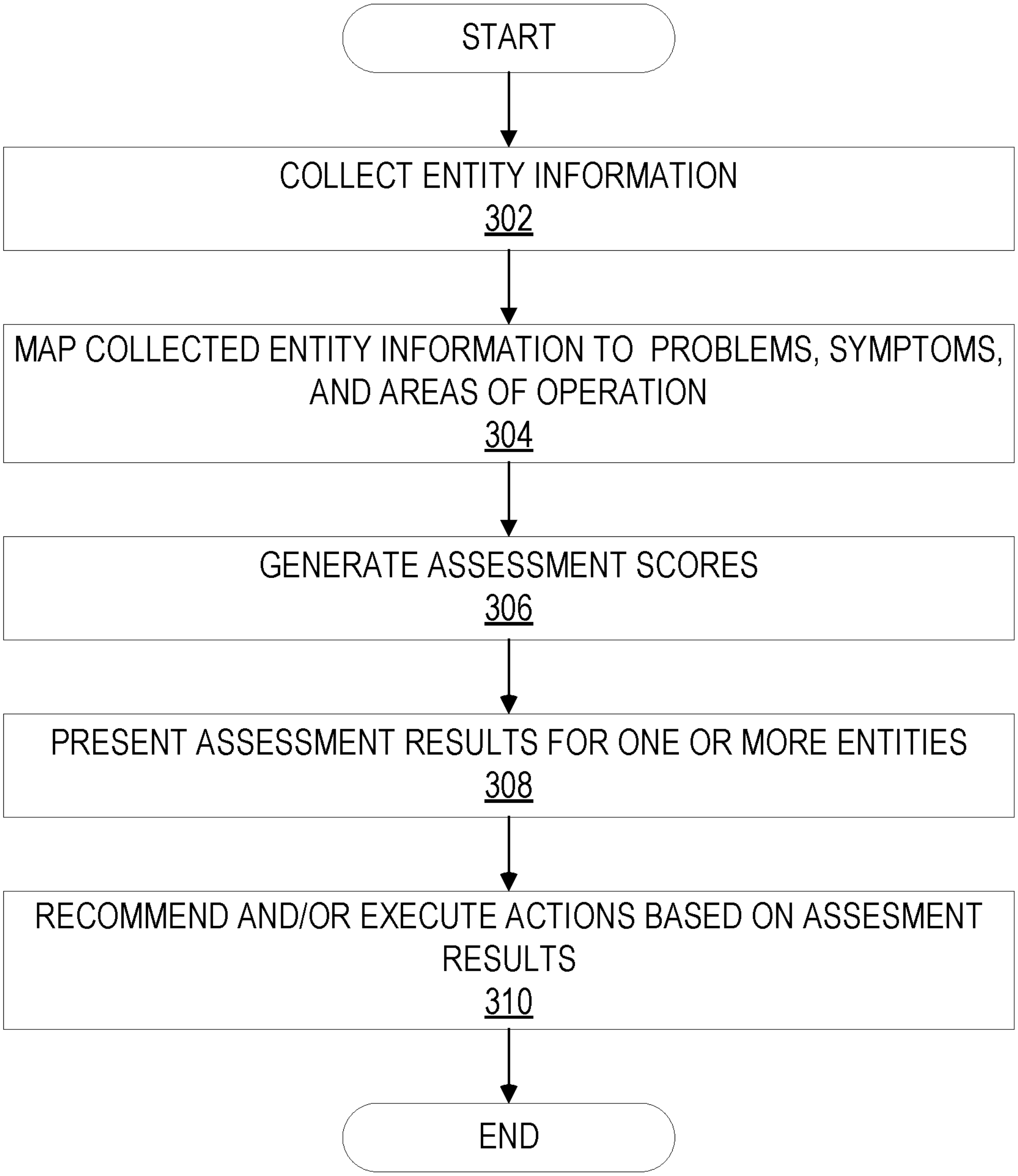
FIG. 3 illustrates an example set of operations for providing real-time guidance and assessments in accordance with some embodiments.

FIG. 3 illustrates an example set of operations for providing real-time guidance and assessments in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the set of operations includes collecting entity information (operation 302). In some embodiments, a user inputs entity information directly through a user interface as part of an application flow. Example user interface flows are provided in the sections below. Additionally or alternatively, entity information may be extracted from external services, which may include cloud services that leverage artificial intelligence to provide extensive, up-to-date, and accurate information about companies. For instance, a process may download or otherwise access current information for one or more target entities from the external cloud service. The process of collecting the entity information may include generating and sending a targeted request, such as an HTTP request that invokes a representational state transfer (REST) endpoint of the cloud service to access information maintained by the external service. The process may subsequently extract the entity information from one or more response messages received from the cloud service via the REST endpoint. In other cases, the process may collect entity information in batches, such as by periodically performing batch downloads of entity information for one or more entities from the cloud service.

The set of operations further includes mapping the collected entity information to one or more problems, symptoms, and areas of operation (operation 304). In some embodiments, a mapping function determines a mapping between the entity information and a set of one or more problems that potentially degrade operations of the entity. The mapping function may receive the entity information, as input, and, in response, establish a link between the entity and root nodes, symptom nodes and area nodes associated with a problem. The mapping function may use rules, heuristics, and/or machine learning to establish the links, where a links identifies one or more nodes within data model 100 that are relevant to an entity and a set of collected entity information.

The set of operations further includes generating assessment scores for one or more areas of operation, symptoms, and/or root causes (operation 306). A scoring model may generate a score for nodes as a function of how severe one or more problems associated with a node are. For instance, an assessment score for a root cause may indicate a severity of the root cause with respect to problems experienced by the entity. An assessment score for a symptom may be computed based on the severity of the symptom experienced by the entity, and an assessment score for an area may be computed based on the problems experienced by the entity in the corresponding area of operation. In some embodiments, the scoring model may compute the symptom assessment score by aggregating root cause scores linked to the symptom and area assessment scores by aggregating symptom scores linked to the area. The scoring model may generate scores using heuristics, machine learning, natural language processing, and/or statistical analysis.

The set of operations further includes presenting assessment results for the one or more entities (operation 308). The assessment results may highlight underperforming areas of operation, severe symptoms, and associated root causes. Interface engine may present the assessment results in visual form, such as through a star or radar chart. Example visualizations are presented below.

The set of operations further includes recommending and/or performing actions based on the assessment results (operation 310). For example, the process may recommend or deploy software solutions to address root problems, ameliorate severe symptoms, and optimize underperforming areas. Additionally or alternatively, the process may trigger other actions, such as highlighting opportunities in a customer relationship management application to target entities that are underperforming in a particular area, sorting actionable items in an opportunity pipeline, training personnel on opportunities as viewed by system versus human users, selecting targeted messaging to serve through a data management platform, populating a segment in a flow defined for an online campaign, evaluating a smart contract, and triggering one or more blockchain transactions.

3.2 Example Conversational Interface Flow

Figure 4A:
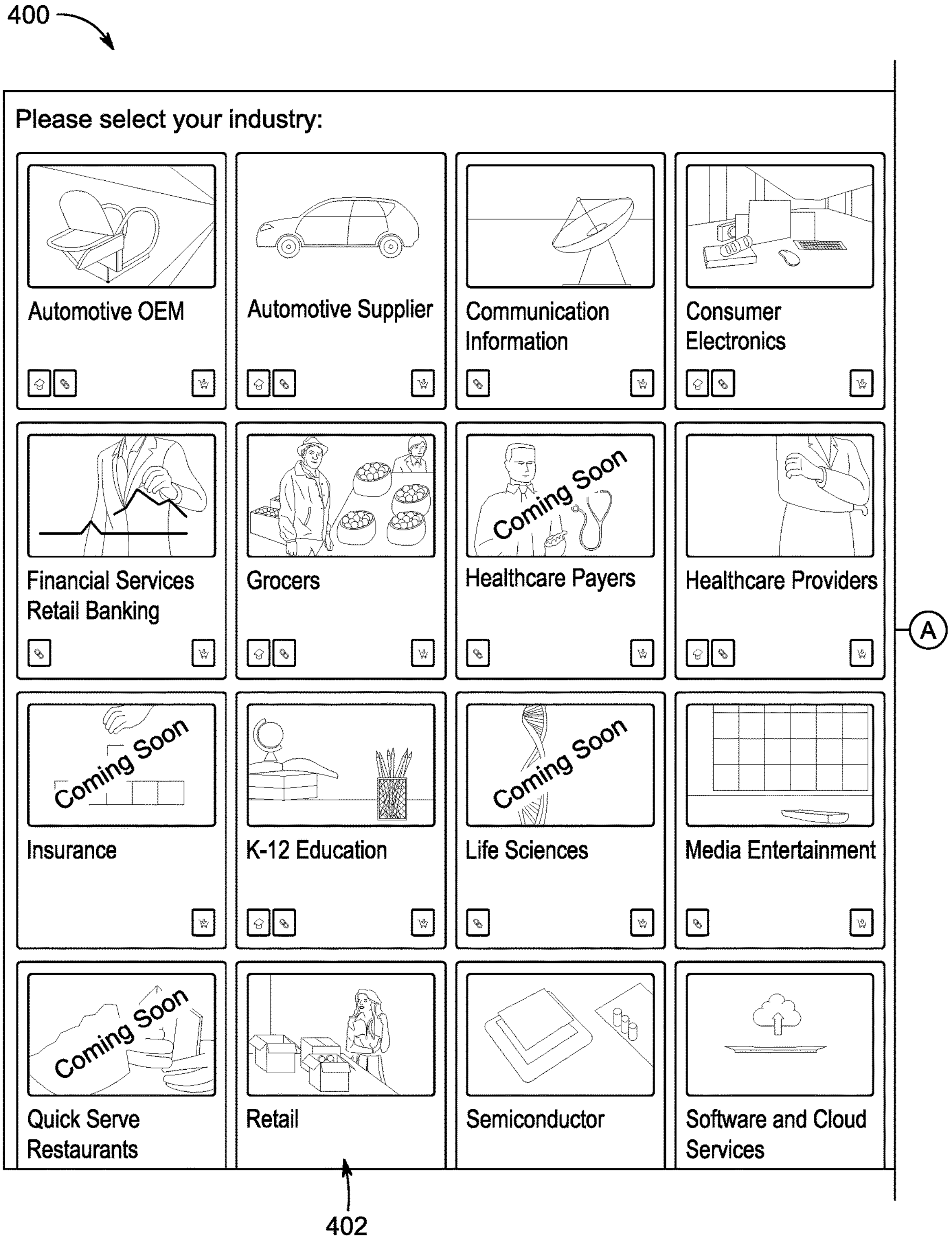
FIGS. 4A-4E illustrate an example application flow for an industrial language conversation in accordance with some embodiments.
Figure 4A:
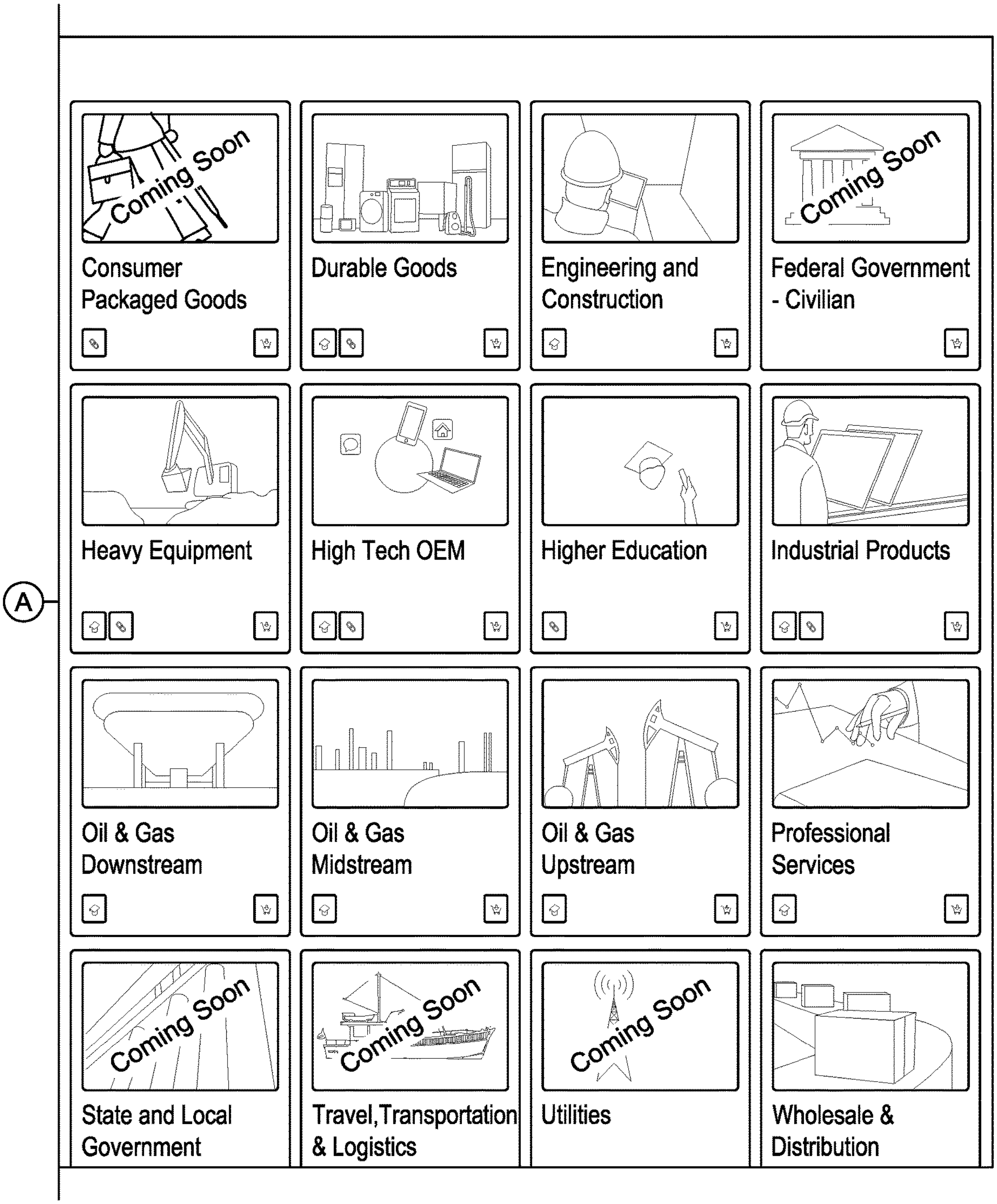

FIGS. 4A-4E illustrate an example application interface flow for an industrial language conversation in accordance with some embodiments. Entity information collected via the interface flow may be fed to the mapping function and/or scoring model 206 to provide real-time guidance and/or digital transformation assessments, as discussed further herein. Referring to FIG. 4A, interface 400 includes tiles representing various industries. A user may select a tile to indicate an industry that is relevant to an entity. For example, the user may select tile 402 to drill-down on the retail industry. If the user selects tile 402, flow manager 204 may identify a node within data model 100 that has been mapped to the user interface element. Flow manager 204 may then traverse data model 100 from the identified node to linked nodes within area layer 102 in order to identify which areas of operation are relevant to the entity's industry.

Figure 4B:
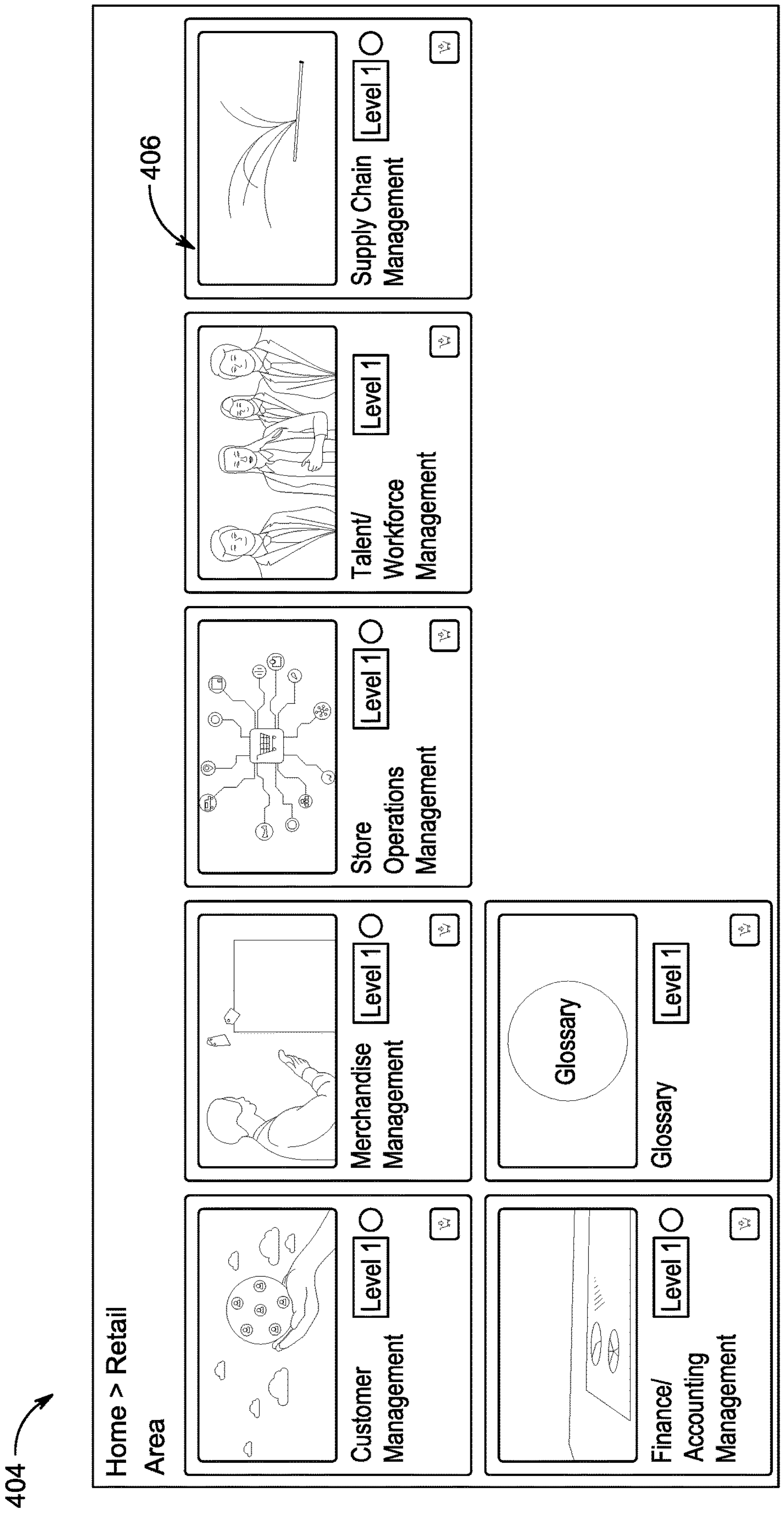

FIG. 4B illustrates interface 404, which may be presented responsive to a user selecting tile 402. Interface 404 includes tiles for various areas of operation associated with the retail industry. Interface 404 may be generated and rendered based on which tiles and/or other user interface elements are mapped to the relevant nodes within area layer 102. A user may select a tile to assess an area of operation in more detail. For example, the user may select tile 406 to drill-down and view symptoms that potentially affect supply chain management. If the user selects tile 406, flow manager 204 may identify a node within data model 100 that has been mapped to the selected user interface element. Flow manager 204 may then traverse data model 100 from the identified node to linked nodes within symptom layer 104 in order to identify the relevant symptoms.

Figure 4C:
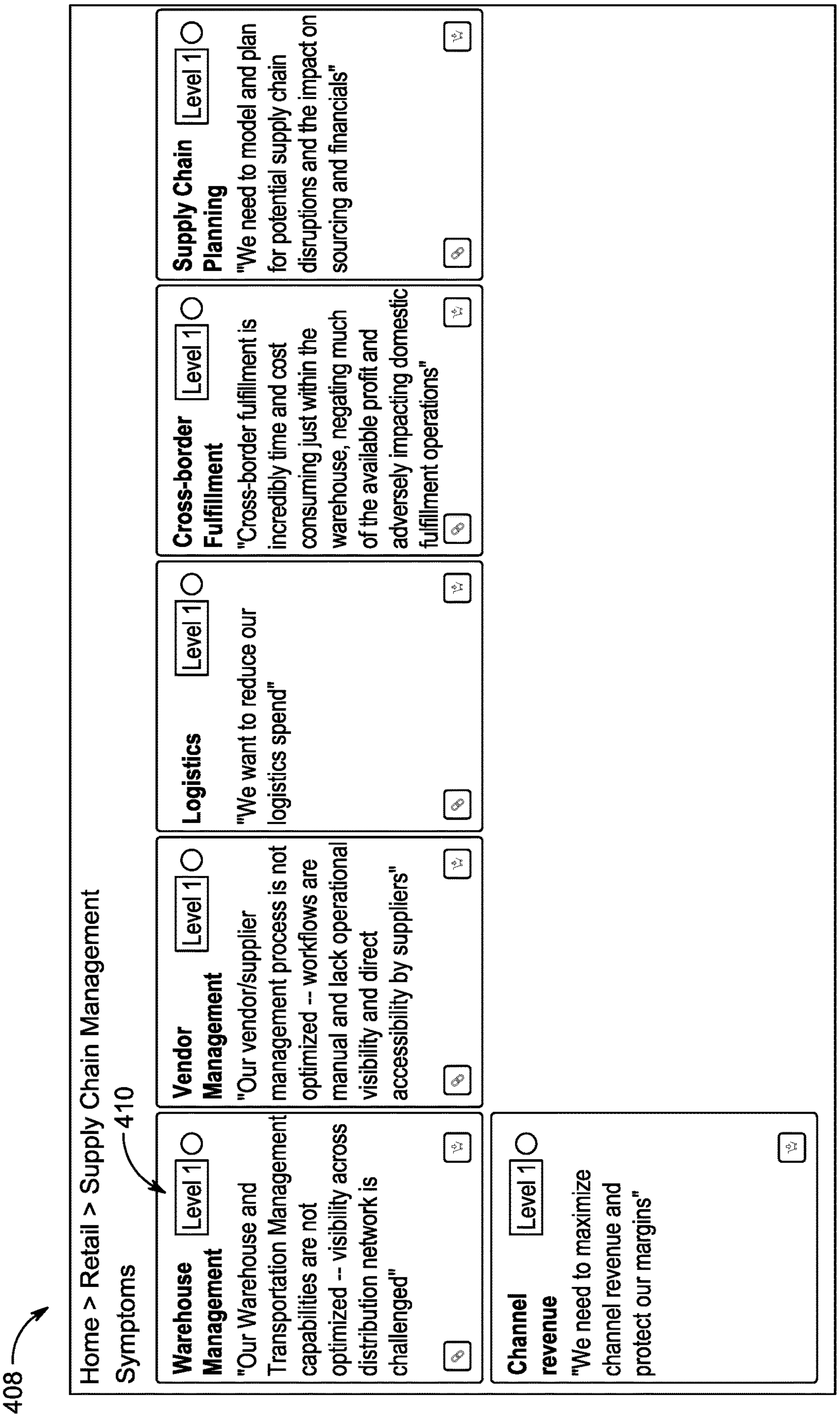

FIG. 4C illustrates interface 408, which may be presented responsive to a user selecting tile 406. Interface 408 may be generated and rendered based on which tiles and/or other user interface elements are mapped to the relevant nodes within symptom layer 104. Interface 408 includes tiles identifying symptoms that may degrade supply chain management operations. Each symptom includes a corresponding description of the problem. The descriptions may vary depending on the selected industry, including language that is specific to the selected industry or sector. For example, the description of a supply chain management symptom in the retail industry may differ from supply chain management problem descriptions in other industries. Additionally or alternatively, the set of symptoms that are presented for supply chain management may vary depending on the selected industry. The symptoms and descriptions, tailored by industry and sector, may facilitate conversations between users that are not familiar with an industry and experts in the industry. A user may select a symptom tile to assess the symptom in more detail. For example, the user may select tile 410 to drill-down and view root causes that are potentially the underlying reason for sub-optimal warehouse management. If the user selects tile 410, flow manager 204 may identify a node within data model 100 that has been mapped to the selected user interface element. Flow manager 204 may then traverse data model 100 from the identified node to linked nodes within root cause layer 106. Flow manager 204 may track and record the industry, areas of operation, symptoms, and potential root causes within the set of collected entity information based on the user selections.

Figure 4D:
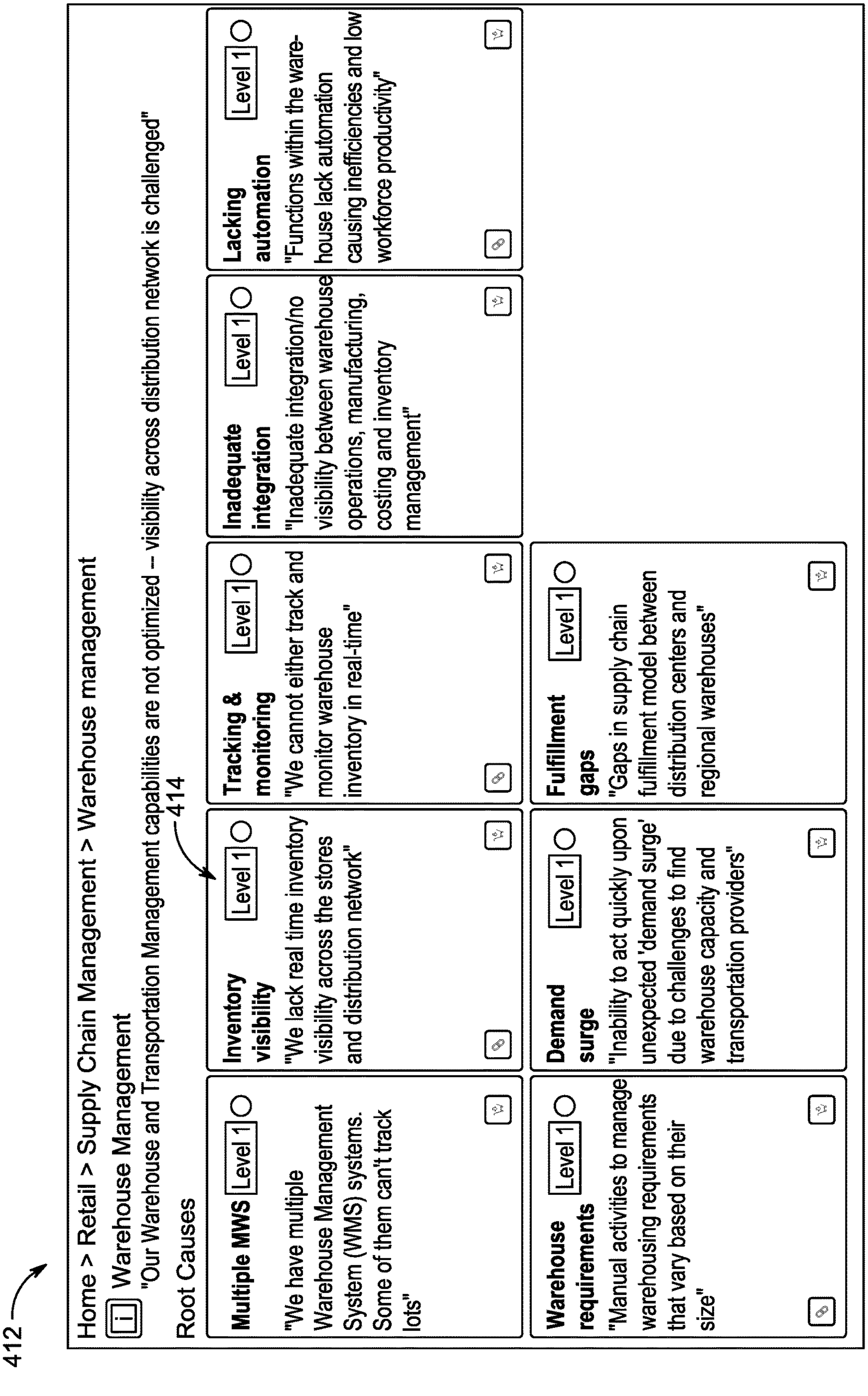

FIG. 4D illustrates interface 412, which may be presented responsive to a user selecting tile 410. Interface 412 may be generated and rendered based on which tiles and/or other user interface elements are mapped to the relevant nodes within root cause layer 106. Interface 412 includes tiles for various root causes associated with a symptom. A user may select a tile to view assets that may be deployed to address the root cause. For example, the user may select tile 414 to drill-down and view assets to improve inventory visibility. If the user selects tile 414, flow manager 204 may identify a node within data model 100 that has been mapped to the selected user interface element. Flow manager 204 may then traverse data model 100 from the identified node to linked nodes within asset layer 108 in order to identify the recommended assets to address a problem.

Figure 4E:
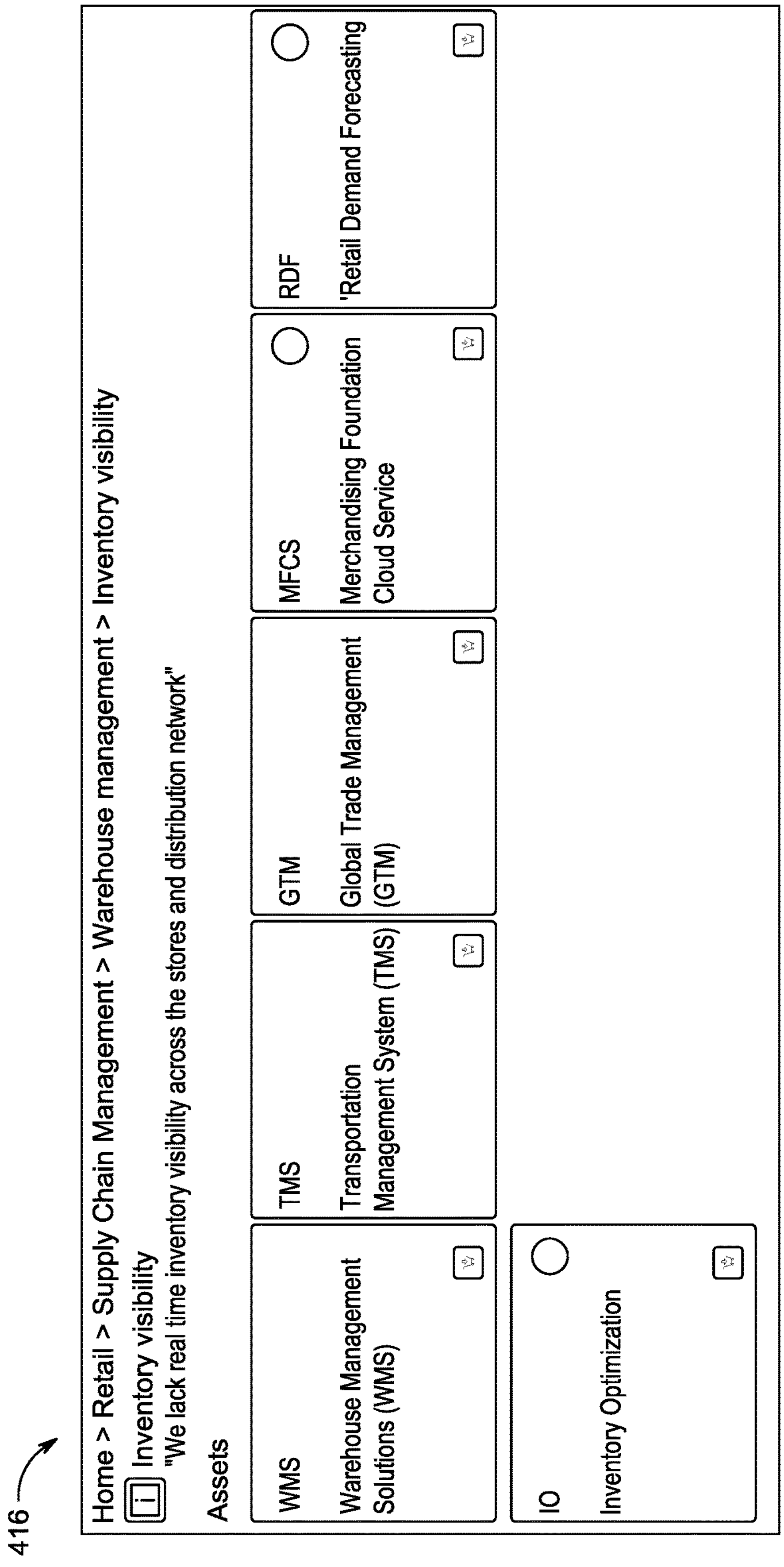

FIG. 4E illustrates interface 416, which may be presented responsive to a user selecting tile 414. Interface 416 may be generated and rendered based on which tiles and/or other user interface elements are mapped to the relevant nodes within asset layer 108. Interface 416 include tiles representing various assets that may address the root cause of a symptom to improve performance in an area of operation. For example, interface 416 may allow the user to browse warehouse management solutions to improve inventory visibility during supply chain management operations.

The example flow above provides a natural progression for a user that may be unfamiliar with the specific details and various areas of operation of an industry. In other cases, the user may bypass one or more screens in the application flow through a search and filter interface. For example, FIG. 5A and 5B illustrate an example flow using a search and filter interface.

Figure 5A:
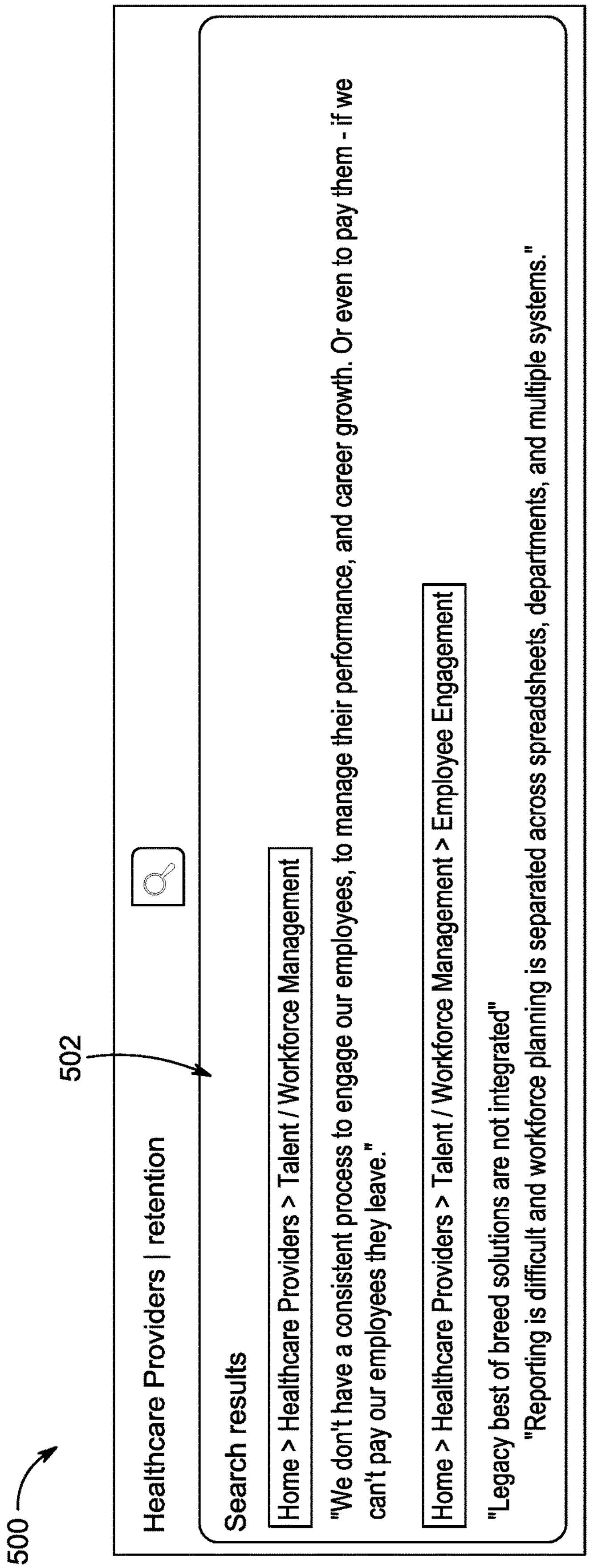
FIGS. 5A-5B illustrate an example application flow using a search and filter interface in accordance with some embodiments.

Referring to FIG. 5A, search interface 500 allows the user to select an industry from a drop-down menu and enter search terms, such as a phrase or search topic. Interface pane 502 displays the search results indicating where the phrase or search term is used in an industry language conversation. Search interface 500 may use approximate string matching, also referred to as fuzzy search, where the search algorithm first finds approximate substring matches inside the entered string and subsequently finds dictionary strings that approximately match the pattern. Thus, exact pattern matches are not required. In the present example, there are two search results, and the shortest path is presented first. The user may select search result 502 to pick up an industry language conversation at the current state.

Figure 5B:
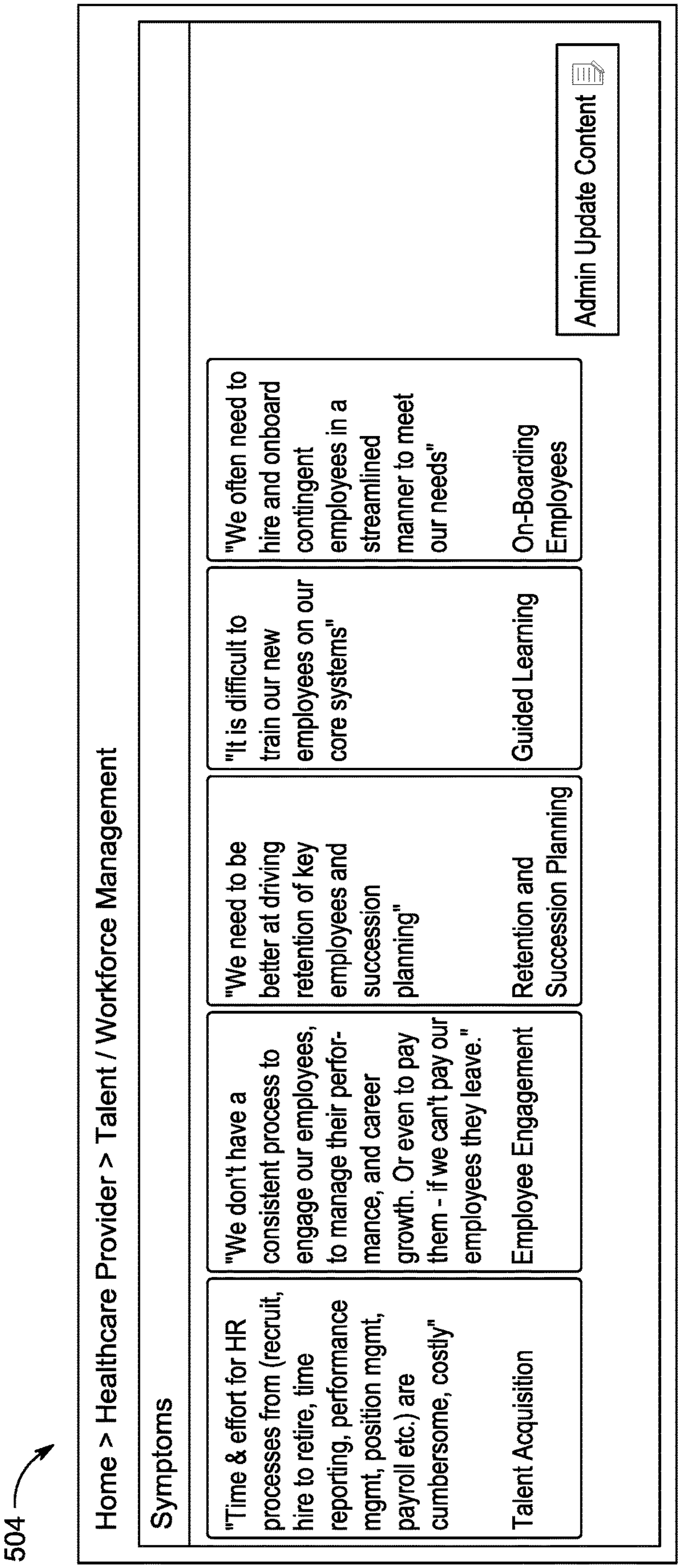

FIG. 5B illustrates interface 504, which may be presented responsive to the user selecting search result 502. The current state of the conversation presents symptoms associated with talent and workforce management operations. Thus, the user may jump midway into a conversation flow using the search and filter interface.

In some embodiments, assessment services 202 may restrict which area, symptom, root cause, and/or asset tiles are visible and/or accessible to various users. For example, certain tiles may be visible and accessible only to users that have a threshold certification level or a threshold permission level. When a user logs in to access the service, a user's certifications and/or permissions may be determined based on the user's authentication credentials, IAM policies, and/or security settings. Interface engine 210 may determine how to generate and render the interface, including which tiles to include, based on such user attributes.

3.3 Shopping Cart Interface

In some embodiments, users may identify relevant areas, symptoms, and/or root causes using a shopping cart interface. As the user is engaged in a conversation flow, the user may select a shopping cart icon on one or more tiles. The selections may be added to a virtual shopping cart, which the user may review before concluding a conversation. Reports, feedback, and/or assessments may be generated based on the items added to a cart at checkout.

Figure 6A:
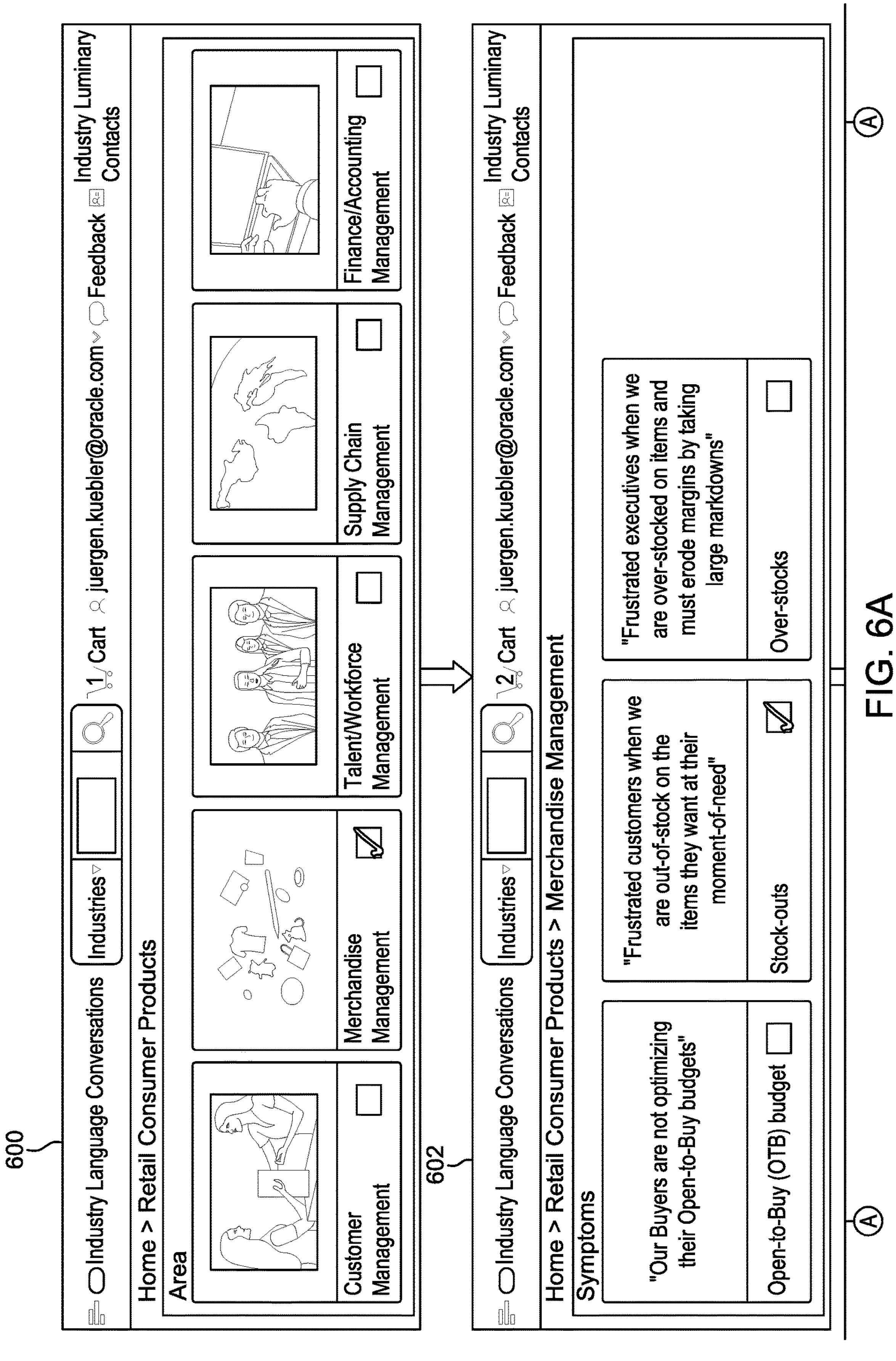
FIGS. 6A-6B illustrate an example application flow for updating and accessing a shopping cart interface in accordance with some embodiments.
Figure 6A:
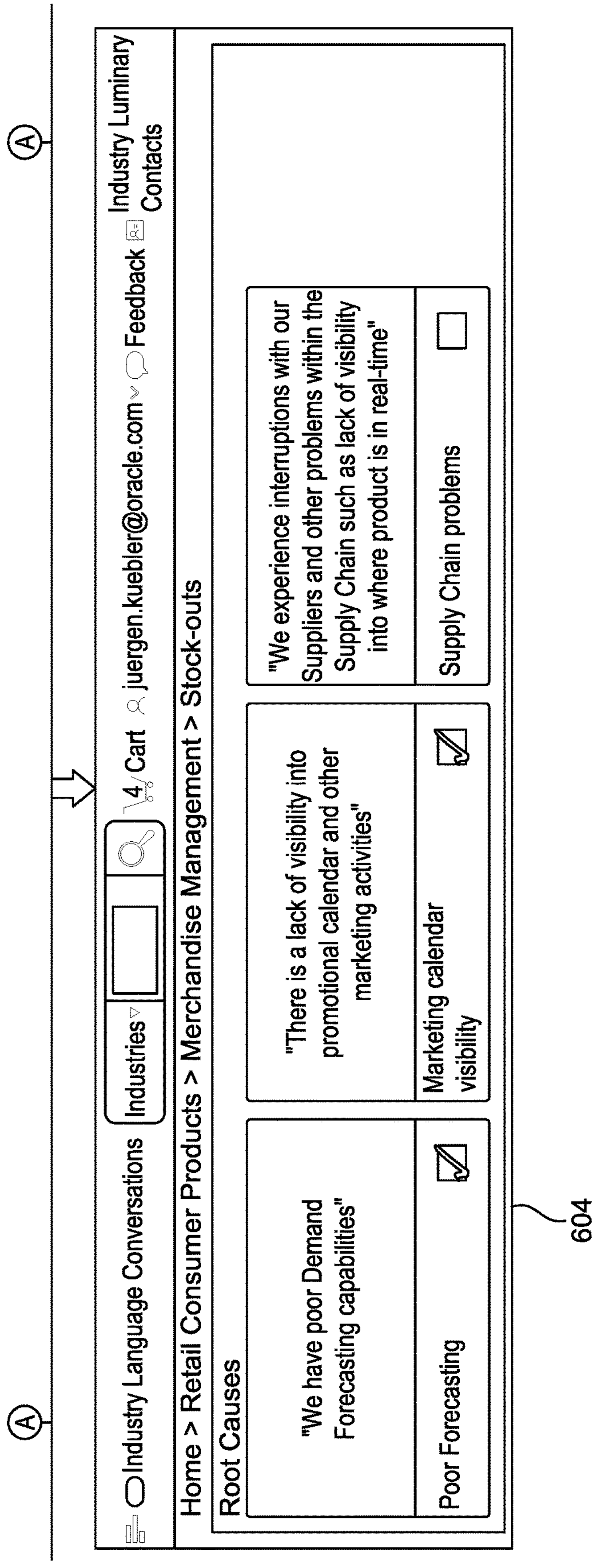
Figure 6B:
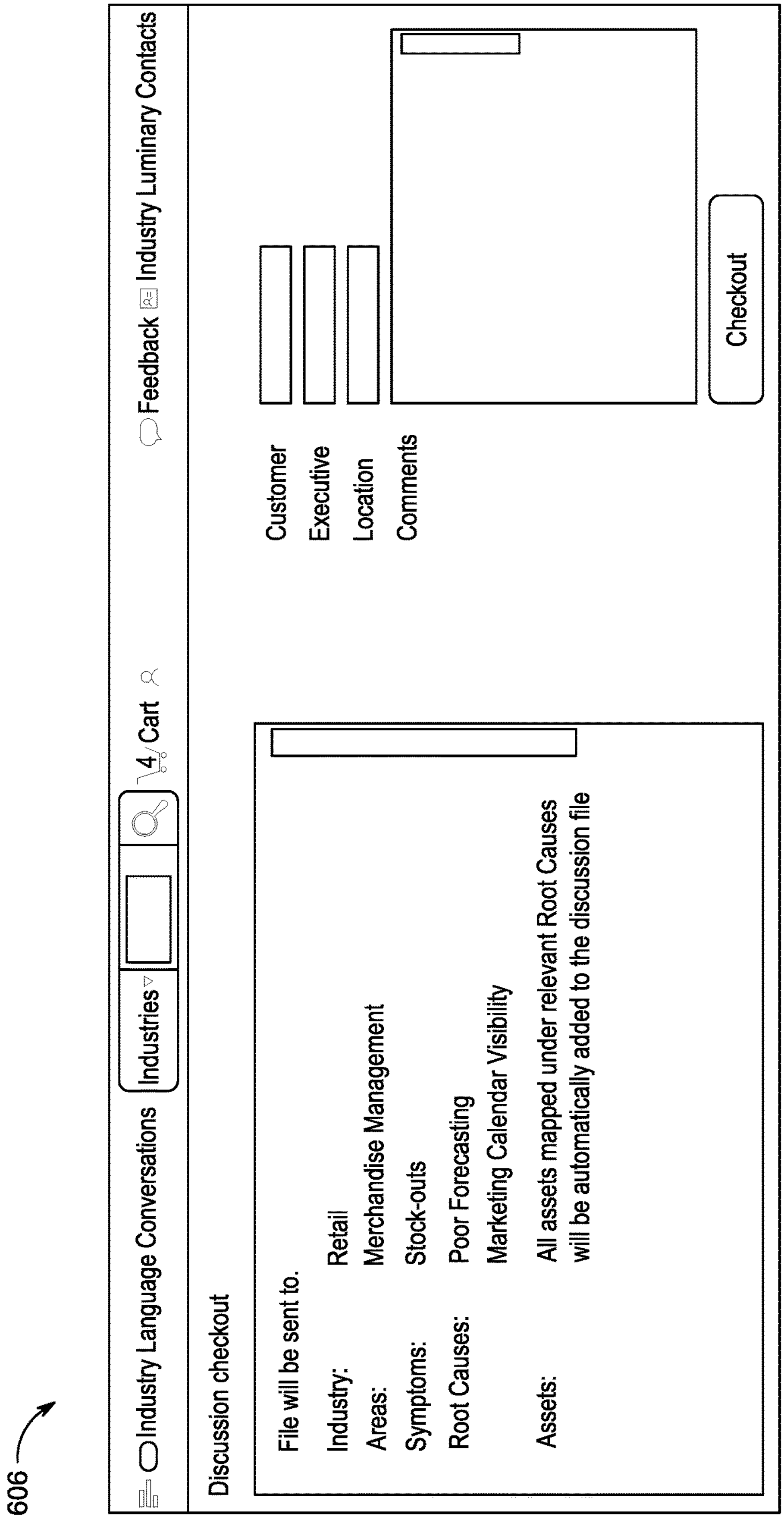

FIG. 6A-6B illustrate an example application flow for updating and accessing a shopping cart interface in accordance with some embodiments. As with the conversational flow interface described above, the shopping cart interface may render icons and other user interface elements based on a traversal of nodes within data model 100 that have been mapped to the user interface elements. Referring to FIG. 6A, interface 600 allows the user to add one or more areas to a virtual shopping cart. For example, the user may select the checkbox on a tile to add the area to the shopping cart. The user may add items without advancing to the next screen in the application flow. A visual indicator, such as a checkmark, may be displayed on the tile for each area that is in the shopping cart. Additionally or alternatively, a shopping cart icon may display the total number of items added to the shopping cart. In the illustrated example, the user has added a single area item, Merchandise Management, to the shopping cart.

Responsive to selecting the tile for Merchandise Management, interface 602 may be presented. The user may then add one or more symptoms to the virtual shopping cart. In the illustrated example, the user has selected the symptom, Stock-outs, to the shopping cart. In response, the shopping cart icon is updated to display the incremented item count and the tile is updated to reflect the addition to the virtual shopping cart.

Responsive to selecting the Stock-out tile, interface 604 may be presented. The user may then add one or more root causes to the shopping cart. In the illustrated example, the user has selected two root causes: Poor Forecasting and Marketing Calendar Visibility. In response, the shopping cart icon is updated to display the incremented item count, which brings the total count to four in the present example including one area, one symptom, and two root causes.

FIG. 6B illustrates an example view of checkout interface 606 in accordance with some embodiments. Once the user has finished adding items to the virtual shopping cart, the user may proceed to checkout interface 606, which presents a summary of the items in the cart. Checkout interface 606 further indicates that all the assets mapped to the relevant root causes will be automatically added to a discussion file upon checkout. The user may review the summary and select the checkout button if satisfied. In response, system 200 may generate and send a discussion file to a user-provided email address or a system-determined user address that is linked to the user's authentication credentials.

3.4 Questionnaire Interface

Figure 7:
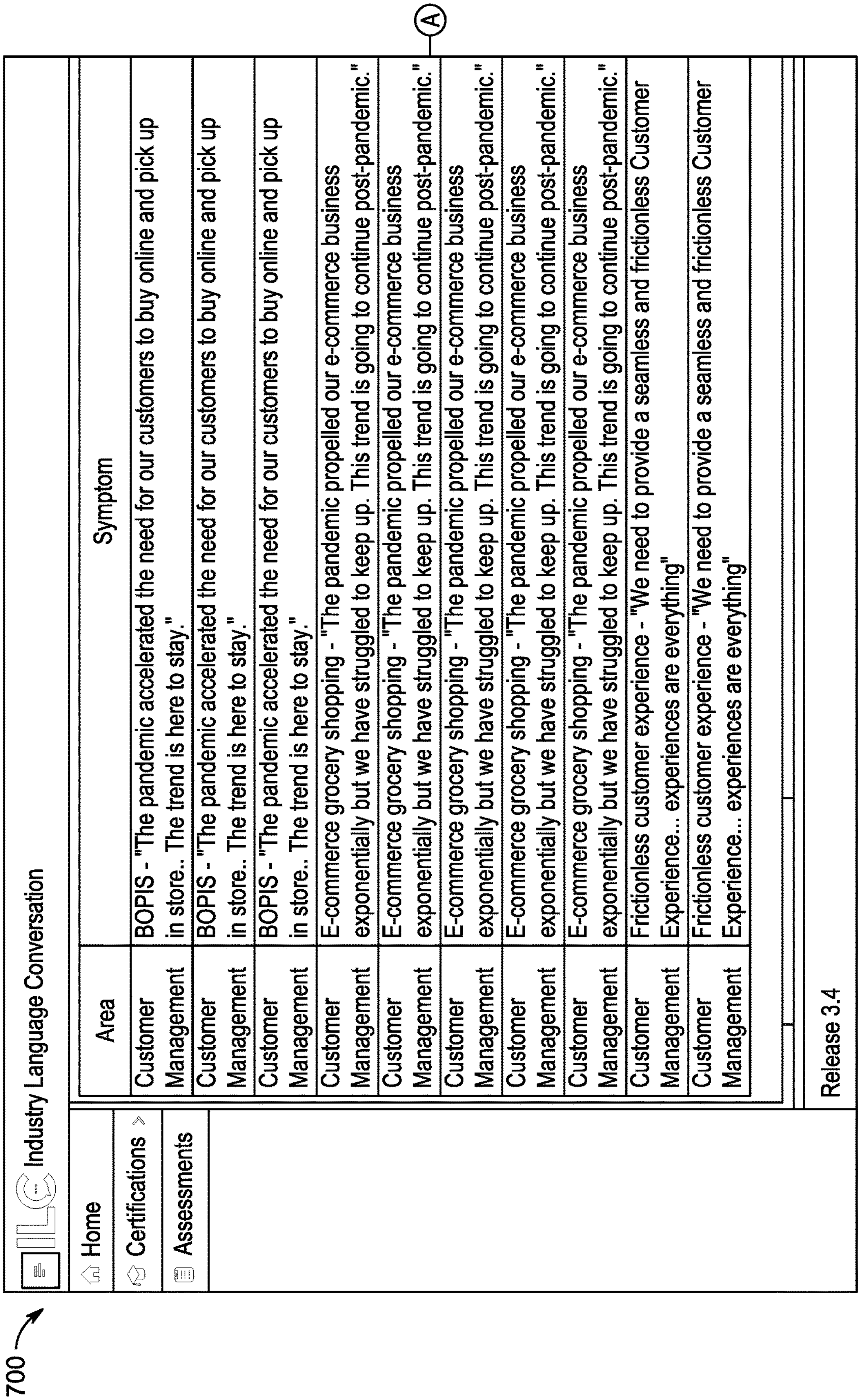
FIG. 7 illustrates an example interface for collecting entity information in accordance with some embodiments.

FIG. 7 illustrates another example interface for collecting entity information in accordance with some embodiments. Interface 700 includes an online questionnaire for a relevant area of operation. In the illustrated example, a user is prompted to fill out a questionnaire for Customer Management. The form identifies different symptoms, root causes, and corresponding descriptions. Each root cause is formulated as a problem, where agreement confirms the problem and disagreement denies the problem. Radio buttons are presented that allow the user to specify a degree with which they agree or disagree that an entity is experiencing the described problem. The stronger the user agrees with a problem, the further away the entity gets from an optimum. Scoring model 206 may account for the answers when formulating assessment scores.

In some embodiments, the online questionnaire is generated and rendered at runtime based on areas of operations, symptoms and/or root causes relevant to an entity. For example, a user may select one or more areas of operation through the shopping cart interface or conversational interface previously described. In response, system 200 may traverse data model 100 to identify questions that are mapped to selected nodes and/or children of the selected nodes. System 200 may aggregate the questions mapped to the nodes to generate and render the online questionnaire during application runtime. The questions may be presented using sector-specific language based on the industry and/or other entity information provided by the user.

In the example depicted in FIG. 7, interface 700 presents questions for a single area of operation and three separate symptoms. However, the questions that are presented may vary depending on the collected entity information. For example, the combination of questions presented to a user may vary from entity to entity. An online questionnaire may include questions for different areas of operations, symptoms, and/or root causes. Additionally or alternatively, the language of the root cause statements and questions may vary from one entity to the next to reflect sector-specific terminology. Thus, problems that affect multiple sectors may be formulated using different sector-specific language in different questionnaires to facilitate understanding.

3.5 Assessment Scores and Visualizations

In some embodiments, scoring model 206 generates assessment scores for areas, symptoms, and/or root causes based on the collected entity data. Scoring may account for answered questions, if any, through an online questionnaire. For example, a performance score between 0% and 100% may be assigned to a root cause based on how strongly the user agrees or disagrees with a problem. A higher assessment score may indicate a higher level of probability or confidence that the entity is experiencing a problem or that a user agrees that an entity is experiencing a problem based on the answers submitted via the online questionnaire. Conversely, a lower assessment score may indicate a lower likelihood that the entity is experiencing the problem or that the user agrees that the entity is experiencing the problem. In other cases, a higher assessment score may indicate a higher level of probability or confidence that the entity is performing well and not experiencing problems. In this scenario, a higher score may be assigned if the user disagrees with a problem than if the user agrees with the problem. Thus, the exact values assigned by scoring model 206 may vary depending on the particular implementation.

Additionally or alternatively, the score may be determined and/or adjusted based on entity data from the shopping cart interface or extracted through external sources. In some embodiments, scoring model 206 or an external cloud service may leverage artificial intelligence, machine learning, and/or natural language processing to parse entity information and determine whether the entity is experiencing a problem. For instance, an AI-based service may analyze information about an entity to determine whether the entity has recently experienced a security breach, lacks information technology capabilities, and/or is experiencing other recent difficulties. The detected problems may be mapped to one or more corresponding root cause nodes within data model 100. A probabilistic assessment score may be generated for the nodes based on a level of uncertainty or confidence associated with the model's prediction that the entity is experiencing the problem.

In some embodiments, scoring model 206 may generate an aggregate assessment score for a node by averaging or otherwise aggregating scores from multiple sources. For example, scoring model 206 may average the questionnaire-based assessment scores with the AI-based assessment scores. The scores may be equally weighted or weighted differently, depending on the particular implementation. In other embodiments, scoring model 206 may select a single score based on one or more factors. For instance, scoring model 206 may use the questionnaire-based score by default if available and generate an AI-based score if not available.

In some embodiments, scoring model 206 generates assessment scores for symptoms and areas by aggregating the assessment scores assigned to nodes that are linked through data model 100. For example, scoring model 206 may generate a symptom assessment score by averaging the scores of the root causes and an area assessment score by averaging the scores of the symptoms. Symptoms and/or root causes may be weighted based on how significant the impact is on performance. However, the scoring criteria and formula may vary depending on the particular implementation.

In some embodiments, scoring model 206 may be trained to assign scores based on learned patterns. For example, scoring model 206 may be trained to learn patterns in answer sets and then applied to predict an answer to a question that is not explicitly given by a user. Thus, scoring model 206 may infer an answer to a question based at least in part on the answers to one or more questions provided through interface 700. Scoring model 206 may then assign a score to a root cause, symptom, and/or area based on the inferred answer.

Figure 8A:
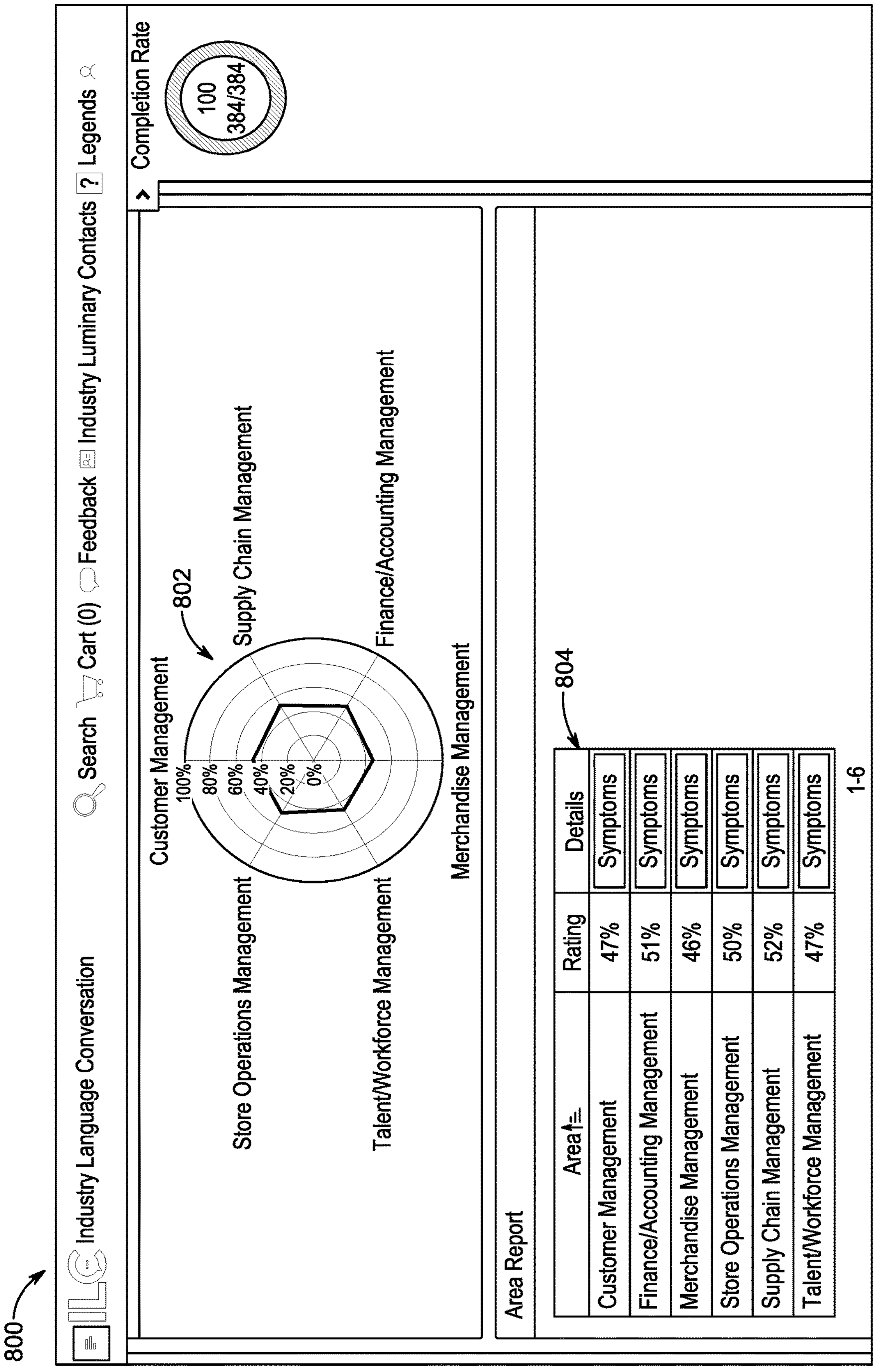
FIGS. 8A-8B illustrate example visualizations that depict assessment results in accordance with some embodiments.
Figure 8B:
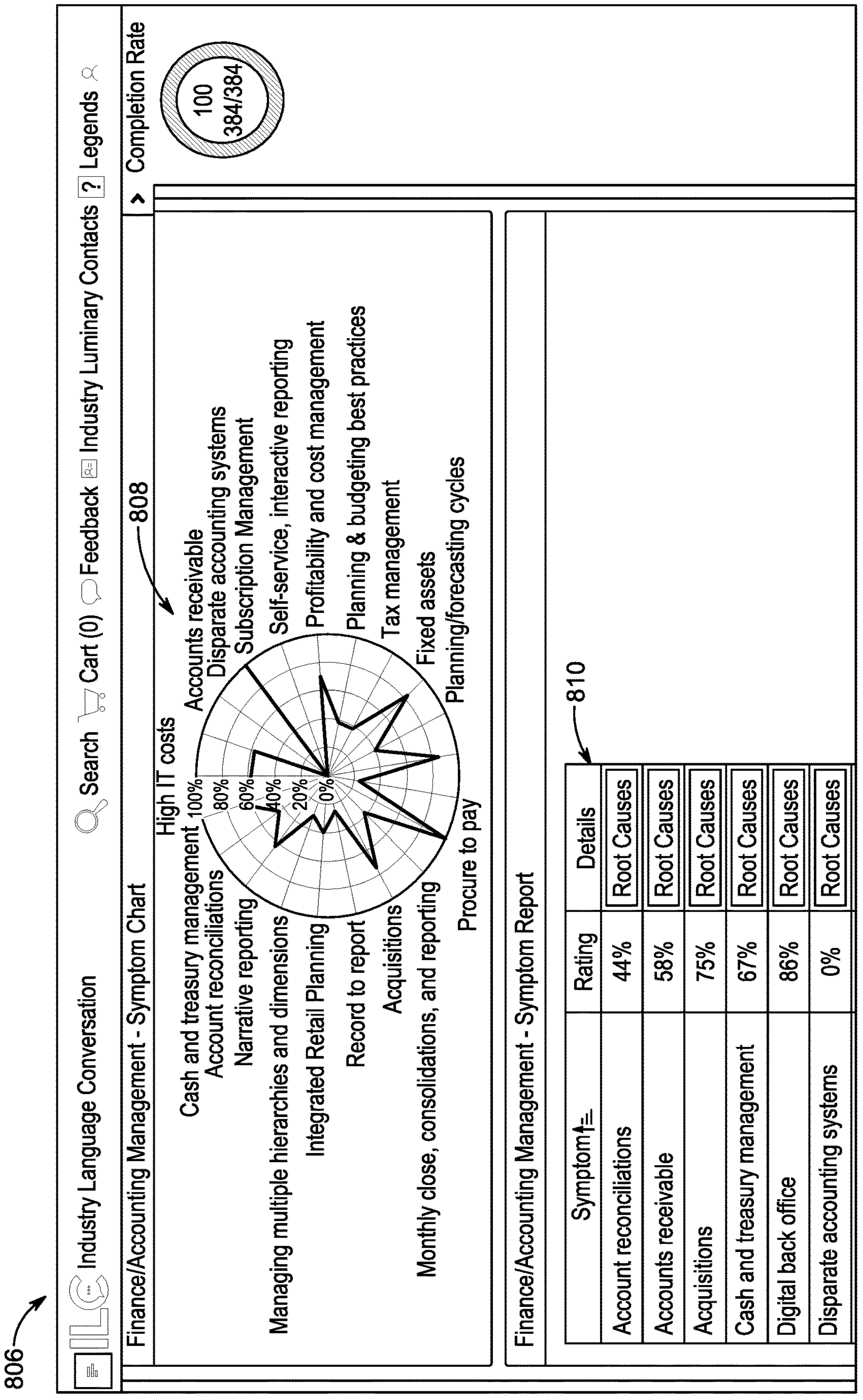

Once the scores have been computed, interface engine 210 may generate a visualization to help provide insights into an entity's performance. FIGS. 8A-8B illustrate example visualizations that depict assessment results in accordance with some embodiments. Referring to FIG. 8A, interface 800 presents radar chart 802 and area report 804. Radar chart 802 shows the performance of an entity across six different areas of operation that are relevant to the entity. Area report 804 shows the exact score/rating for each of the areas. Area report 804 further includes links that allow the user to drill-down and view the symptoms associated with each area.

Referring to FIG. 8B, interface 806 includes radar chart 808 and symptoms report 810. Radar chart 808 includes a visualization generated as a function of assessment scores for a set of symptoms linked to a selected area of operation. Symptoms report 810 allows the user to view the assessment score for each individual symptom. Symptoms report 810 further allows the user to drill-down and view the root causes associated with each symptom.

3.6 Benchmark Comparisons

Benchmark engine 208 may generate benchmark assessment scores for root causes, symptoms, and/or areas of operation. In some embodiments, benchmark engine 208 maintains separate benchmark models on a per-industry and/or per-sector basis. Additionally or alternatively, benchmark engine 208 may maintain a benchmark across all industries.

Figure 9:
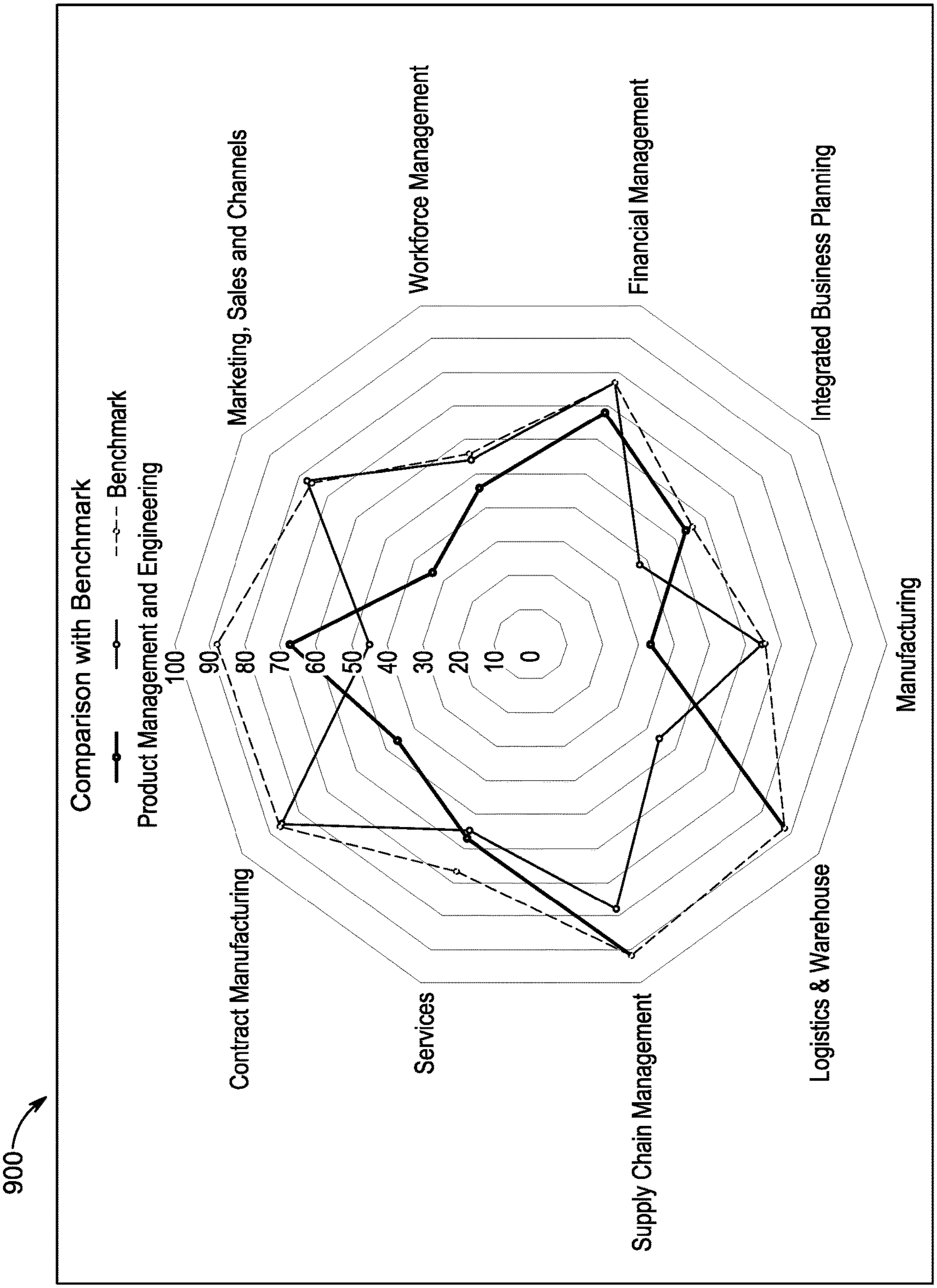
FIG. 9 illustrates an example visualization that compares assessment results for multiple entities to a benchmark in accordance with some embodiments.

FIG. 9 illustrates an example visualization that compares assessment results for multiple entities to a benchmark in accordance with some embodiments. Radar chart 900 shows assessment scores for two entities and a benchmark across several different areas of operation. Radar chart 900 allows a user to quickly identify which areas of operation are underperforming and outperforming the benchmark scores. The users may leverage the information to focus resources on targeting areas that are most likely to benefit from optimization. The users may then drill down to the root causes to determine the primary root causes for underperformance and direct resources at fixing these issues.

3.7 Assessment-triggered Actions

In some embodiments, interface engine 210 presents recommendations based on the assessment scores and/or benchmark comparison. For example, system 200 may analyze the assessment scores and/or benchmark scores for a given entity across one or more areas of operations to determine whether the scores fall below or otherwise satisfy a threshold value. For each respective area of operation that falls below a threshold level of performance, system 200 may identify the symptoms and/or root causes that were most problematic as reflected in the entity's assessment scores for nodes linked to the respective area of operation. System 200 may rank order the root causes based on the scores and traverse data model 100 to identify assets within asset layer 108 linked to the top n root causes. Interface engine 210 may present recommendations to install, purchase, subscribe to, or otherwise deploy the identified assets to improve the respective area of operation. The recommendations may be presented within a user interface page, such as alongside the radar charts and/or symptom reports previously described. Interface engine 210 may further include links that, when selected, trigger installation of an asset or navigate to a webpage that initiates a process for installing, purchasing, subscribing to, or otherwise accessing an asset.

Additionally or alternatively, other actions may be triggered based on the assessment and/or benchmark scores. In some embodiments, the assessment and/or benchmark scores may be generated or consumed by systems that leverage technology to manage relationships with customers, including customer relationship management (CRM) and social relationship management (SRM) systems. These systems may include opportunity pipelines for tracking various stages of customer and/or social media interactions. The assessment scores for an entity may be used to highlight and/or sort actionable items within the opportunity pipeline that are most likely to result in positive interactions. For example, system 200 may highlight, within an opportunity pipeline, the entities with the lowest assessment scores and/or industry benchmarks in a particular area of operation. To highlight the opportunities, system 200 may mark the opportunities with a visual indicator, such as a flag icon, and/or sort the opportunity pipeline such that the actions are presented at the top of the pipeline or otherwise given priority over other actions in the opportunity pipeline.

In some embodiments, system 200 may recommend actions within the opportunity pipeline that optimize the likelihood of a positive customer interaction, such as recommending that a particular product or service be presented to the customer with a goal to improve an area of operation for which the customer has a low assessment score. Additionally or alternatively, system 200 may recommend different points of contact associated with an entity based on which area of operation is underperforming. Contact information, including email addresses and/or phone numbers for different individuals within an organization, may be mapped to different nodes within data model 100. When a particular area of operation is underperforming, system 200 may fetch the contact information for one or more individuals responsible for managing the area of operation within the organization and present the information as recommended points of contact to enhance customer interactions.

In some embodiments, system 200 may compare the results of acting on opportunities detected or highlighted by the system and opportunities originating from other sources, such as from human users. The results may compare metrics such as conversion rates, positive customer impressions, engagement, and click-through rates for the different opportunities. Comparing metrics may indicate whether the system-generated and/or highlighted opportunities have a higher positive rate of interaction than opportunities from other sources. The results of the comparison may be useful to train personnel on how to better prioritize actions within a pipeline, highlighting which actions were successful and which actions were unsuccessful.

In some embodiments, the assessment and/or benchmark scores may be consumed by data management platforms to optimize profiling, analyzing, and/or targeting online communications. As an example, users may define flows for an online campaign using a data management platform. A campaign flow may define logic for delivering targeted online communications, which may be delivered by a server to a web browser application, email service, short message service (SMS), and/or other online communication channel. Within the campaign flow, a user may define parameters and conditions for delivering the online communications as a function of the assessment scores. For example, a user may define an application flow of an online campaign for a software security service, where the application flow includes a segment node with parameters for populating the segment by the data management platform. For instance, the parameters may restrict the segment to only representatives of entities with a cybersecurity assessment score below a threshold value. However, the logic for populating the segment may vary and be arbitrarily defined by an end user.

During runtime of an online campaign, a data management platform may fetch the most recent assessment scores of several different entities for the area of operation referenced in a campaign flow. Based on the assessment scores, the data management platform may determine which entities have assessment scores satisfying the threshold defined in the campaign flow. The data management platform may then populate a segment for the campaign with the identifiers for entities with recent assessment scores satisfying the threshold. Example identifiers may include hashed email addresses, browser cookies, mobile identifiers, device identifiers, and internet protocol (IP) addresses.

In some embodiments, the data management platform pushes the segment, populated based on assessment or benchmark scores, to other platforms, such as a demand side platform (DSP) or a supply side platform (SSP). The platforms may use the populated segment data to monitor requests to deliver customized messages from client applications or devices. For instance, the platforms may monitor requests received from browser applications for cookies or device identifiers that match an identifier in the segment. If a match is detected, then the targeted message may be delivered and rendered in a page of the browser application. If a match is not detected, then a different message may be selected and rendered within the browser application. The message may include images, text, video, and/or other media content presented through the browser application to an end user. The message may further include embedded hyperlinks for accessing a technical solution to a problem the entity is currently experiencing. Restricting messages to a subset of clients that are most likely to engage with and respond positively to a message may optimize the resources directed to executing and managing an online campaign.

4. ARTIFICIAL INTELLIGENCE, MACHINE LEARNING, AND DEEP LEARNING APPLICATIONS

In some embodiments, artificial intelligence (AI), machine learning (ML), and deep learning applications may leverage the assessment data to perform actions and formulate predictions, insights, and recommendations. For example, AI applications may implement predictive, deterministic outcomes and recommendations based on streaming the assessment data, ML applications may implement self-learning algorithms to extrapolate outcomes and recommendations, and deep learning applications may use neural networks to solve problems leading to poor assessments.

In an example ML application, training engine 214 may train one or more ML models to predict whether assets will improve assessment scores. Training engine 214 may receive a set of training examples where assets, such as software applications or services, were applied to address a root cause. Each training example may specify how the assessment score changed, if at all, after the asset was deployed. The training process may extract features associated with the assets and learn patterns that are predictive of improved assessments scores. When a new asset is available, such as a new release of a software system, the ML model may be applied to predict (a) if the assessment score will improve an area of operation, symptom or root cause, and (b) how much the assessment score will improve. Thus, the ML model output may be used to formulate recommendations on whether an entity should deploy an asset or not. In some cases, the ML model output may trigger automated actions, such as automatic deployment and/or configuration of an asset.

Other example ML applications may include directing targeted actions and/or messaging toward entities based on extrapolated outcomes. For instance, an ML model may recommend, select, and/or trigger a targeted campaign message to an entity based on learned patterns in the assessment data and the entity's assessment scores. Additionally or alternatively, members of a segment for an online campaign may be selected (added and/or removed) based on the predicted response extrapolated as a function of learned patterns in the assessment scores. As another example, an ML model may sort or prioritize actions in an opportunity pipeline based on which extrapolated outcomes are predicted to be most successful.

Additionally or alternatively, system 200 may use machine learning to optimize the guidance and scoring processes described above. For example, ML services 212 may process feedback from users indicating whether guidance and/or assessments were helpful. To minimize or reduce negative feedback, ML services 212 may modify links between different nodes within data model 100 and/or adjust the industry-specific language associated with a particular node. Additionally or alternatively, ML services 212 may tune the weights applied by scoring model 206 to improve the accuracy of assessment scoring and benchmarking operations.

In some embodiments, system 200 may use machine learning to extrapolate patterns in answers provided in questionnaires. For example, system 200 may learn that entities sharing similar attributes, such as entities in a particular industry, frequently experience one problem if another problem is also present. If a user is inputting answers in a questionnaire for a similar entity, then system 200 may infer the answer one question based on the user's response to the other question. For instance, if the user indicates that the entity is experiencing a problem with tracking warehouse inventory, then system 200 may infer that the entity is also having a problem with inventory visibility across stores and distribution networks if this pattern is prevalent in previously answered questionnaires for entities with similar attributes. Based on the inference, system 200 may predictively answer the question regarding inventory visibility for the user as the user is interacting with the questionnaire in real-time or incorporate the answer into the collected entity information even if the user completes the questionnaire without providing an answer to the question.

In some embodiments, the ML applications described above implement algorithms that may be iterated to learn a target model f that best maps a set of input variables to an output variable, using a set of training data. The training data may include set of examples and associated labels. Each example may be associated with a set of input variables or "features" for the target model f. For instance, the set of input variables may include assessment scores for areas of operation, symptoms, and/or root causes associated with an entity. Additionally or alternatively, the set of input variables may further include other entity attributes, such as the primary industry associated with the entity, the size of the entity (e.g., number of employees, market capitalization, etc.), and recent financial performance of the entity (e.g., recent revenues, earnings, etc.). Additionally or alternatively, the set of input variables may identify which asset or set of assets were deployed to address a technical problem. The associated labels may be associated with the output variable of the target model f, such as a magnitude or percentage change in an assessment score for an area of operation. The training data may be updated based on, for example, feedback on the accuracy of the current target model f. Updated training data is fed back into the machine learning algorithm, which in turn updates the target model f.

Once trained, the target model f may be applied to a new set of input variables. The combination of input variables may be unique and not included in the dataset used to train the target model f. Applying the target model f generates an estimate or prediction for a label as a function of the unique set of input variables and the patterns learned from the dataset used to train target model f. For instance, in the previous example, the target model f may be applied to generate a prediction of the magnitude and/or percentage change in an assessment score if the entity deploys an asset given the current set of assessment scores and/or other current entity attributes.

A machine learning algorithm may include supervised components and/or unsupervised components. Supervised learning may inject the domain knowledge of experts into the machine learning process. For instance, administrators or other users may label training examples. As another example, labels may be assigned to examples in a training dataset based on feedback from entities experiencing problems indicating whether a technical solution worked or not. The feedback may be used to train target model f to output recommendations for entities experiencing similar problems based on which technical solutions were most effective. Unsupervised learning may use algorithms to train ML models without any human input or intervention. Various types of algorithms may be used to train and apply ML models. Example algorithms may include linear regression, logistic regression, linear discriminant analysis, classification and regression trees, naïve Bayes, k-nearest neighbors, learning vector quantization, support vector machine, bagging and random forest, boosting, backpropagation, and/or clustering.

5. BLOCKCHAIN APPLICATIONS

In some embodiments, blockchain applications, such as smart contracts, may consume the assessment data. A smart contract may implement arbitrary logic that uses assessment data based on terms that are agreed to by members of the blockchain network. As an example, an autorenewal transaction for a software service may be triggered within blockchain network 226 only if an assessment score for one or more areas, symptoms, and/or root causes satisfies one or more thresholds. Additionally or alternatively, a renewal or dynamic price may be set in a blockchain transaction based on the assessment score. The assessment scores and resulting transactions may be recorded on distributed ledgers 230, which are immutable.

In some embodiments, smart contracts 228 define conditional logic for executing a blockchain transaction based on the consumed assessment data. The conditional logic may encapsulate stipulations agreed to by two or more participants in the blockchain network that were parties to the smart contract. The conditional logic may compare (a) current assessment and/or benchmark scores and/or (b) changes in the assessment and/or benchmark scores between two points in time to one or more threshold values. The smart contract may execute a blockchain transaction if and only if the conditions defined by the conditional logic are satisfied. When a transaction is completed, distributed ledgers 230 may be updated to reflect the transaction details, including the assessment metrics, benchmarks, and/or other values that triggered execution of the transaction. In the autorenewal example, for instance, the smart contract may check one or more assessment scores for an entity on a monthly, annually, or other periodic basis. The transaction may be executed to renew an entity's subscription to a cloud service if the assessment scores are above a threshold value. Distributed ledgers 230 may include a record of the detected assessment scores and/or other transaction details associated with the executed renewal smart contract.

Updating distributed ledgers 230 may generally comprise adding a block to a blockchain that includes the transaction details. The block may include a hash value generated by applying a cryptographic hash function to a previous block within a blockchain. The cryptographic hash function may be applied to the block contents, including the transaction details and hash value of the previous block, to link the block to any subsequently added blocks in the blockchain. The block hashes make tampering with transaction records nearly impossible, since changing the contents of a block would result in changes to the hash values linking the blocks for all subsequent blocks in the chain. With a permissioned blockchain, only parties that have been granted permission to view a ledger may see the results of a transaction.

Smart contracts may further define transaction logic that incorporates assessment and/or benchmarks scores in a manner that affects the parameters of an executed blockchain transaction. In the dynamic pricing example, for instance, a smart contract may define the price as a function of a relative or absolute change in an entity's score for a particular area of operation between two points in time, such as from the deployment of an asset to an agreed upon date in the horizon. The price of the smart contract may increase the greater the percentage and/or magnitude change in the entity's score. As another example, a smart contract may dynamically adjust the quality of service for an entity's subscription based on monitored assessment scores. If a higher tier of service, such as an upgraded subscription level to a cloud platform, does not increase the benchmark of an entity by more than a threshold value, for instance, then the service may be automatically renewed at a lower and cheaper tier. As previously mentioned, the logic in the smart contracts may be arbitrary. Thus, the manner in which the assessment scores are integrated into chaincode within the blockchain may vary from one contract to the next depending on the agreement of the blockchain participants.

6. COMPUTER NETWORKS AND CLOUD NETWORKS

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICROSERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

TRIGGERS

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In some embodiments, the trigger, when satisfied, might output data for consumption by the target microservice. In other embodiments, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

ACTIONS

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
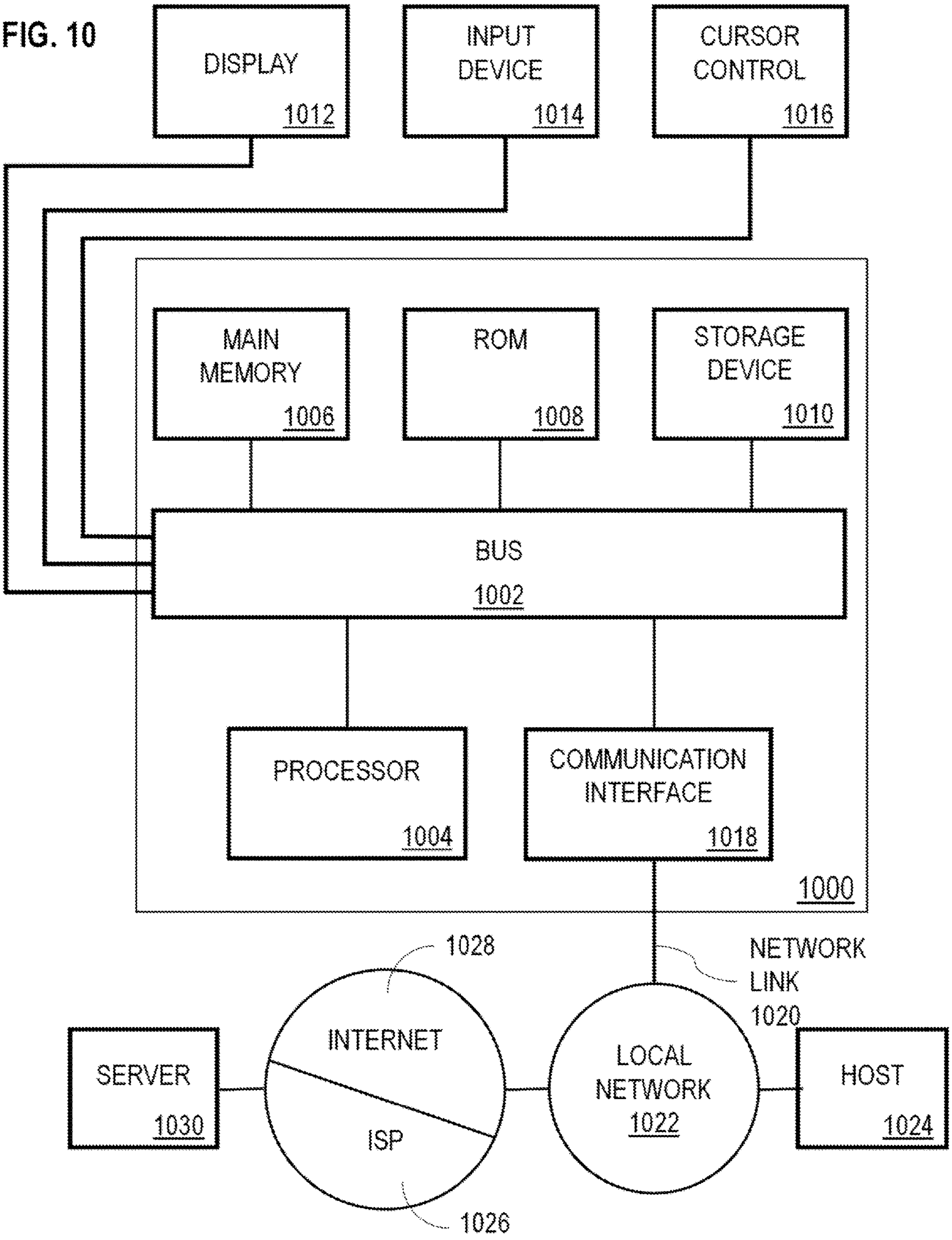
FIG. 10 shows a block diagram that illustrates a computer system in accordance with one or more embodiments.

For example, FIG. 10 shows a block diagram that illustrates a computer system in accordance with some embodiments. Computer system 1000 includes bus 1002 or other communication mechanism for communicating information, and a hardware processor 1004 coupled with bus 1002 for processing information. Hardware processor 1004 may be, for example, a general-purpose microprocessor.

Computer system 1000 also includes main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT) or light emitting diode (LED) monitor, for displaying information to a computer user. Input device 1014, which may include alphanumeric and other keys, is coupled to bus 1002 for communicating information and command selections to processor 1004. Another type of user input device is cursor control 1016, such as a mouse, a trackball, touchscreen, or cursor direction keys for communicating direction information and command selections to processor 1004 and for controlling cursor movement on display 1012. Input device 1014 typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 1000 can receive the data on the network line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:

storing a multilayered data model that includes a first layer of nodes representing different areas of operation, a second layer of nodes representing different symptoms associated with problems that degrade one or more of the different areas of operation, and a third layer of nodes representing different root causes associated with one or more of the different symptoms, wherein each node in the first layer of nodes is linked to at least one node in the second layer of nodes, wherein each node in the second layer of nodes is linked to at least one node in the third layer of nodes;

training, by at least one computer that accesses the multilayered data model, at least one machine learning model based on input data from the multilayered data model and a selected training algorithm to generate at least one trained machine learning model, wherein training the at least one machine learning model comprises iteratively updating links between different layers of the multilayered data model and tuning model weights to minimize negative feedback;

receiving a set of information about an entity through a graphical user interface of an application that accesses the multilayered data model;

mapping by the application, the set of information about the entity to a set of nodes in the multilayered data model, wherein mapping the set of information establishes a link between the entity and at least one node in each of the first layer of nodes, the second layer of nodes, and the third layer of nodes;

determining, by the application based on said mapping, a target set of problems that potentially degrade operations of the entity;

generating, by the at least one trained machine learning model, a prediction comprising (a) a score for each problem in the target set of problems that indicates a severity of the problem for the entity and (b) an output predicting how much a software resource will improve the problem;

deploying, by the application based on the score for each problem in the target set of problems and the output of the at least one trained machine learning model, the software resource predicted by the at least one trained machine learning model to address the problem having a highest severity; and tuning the at least one machine learning model to minimize negative feedback, wherein tuning the at least one machine learning model comprises updating the multilayered data model and the one or more model weights as a function of (a) the score for the problem having the highest severity, and (b) the output predicting how much the software resource will improve the problem.

2. The media of claim 1, wherein the instructions further cause: prompting a user to submit answers to a set of questions that are generated at runtime; wherein the set of information is determined at least in part from the answers to the set of questions.

3. The media of claim 2, wherein the instructions further cause: inferring at least one other answer to at least one other question or at least one root cause of a problem based at least in part on the answers to the set of questions.

4. The media of claim 1, wherein the instructions further cause: generating, based at least in part on said multilayered data model, the graphical user interface, wherein the graphical user interface is a navigable interface that includes links between the root causes, the symptoms, and the areas of operation based on which nodes are linked in the multilayered data model; wherein the navigable interface further includes links from a root cause to a technical solution that addresses the root cause.

5. The media of claim 1, wherein the instructions further cause: presenting a shopping cart interface to a user; receiving a selection of at least one area of operation and at least one symptom to add to the shopping cart interface from the user; wherein the score is generated based at least in part on the at least one area of operation and the at least one symptom added to the shopping cart interface.

6. The media of claim 1, wherein the instructions further cause: generating a first set of scores for a first set of symptoms associated with an area of operation; and generating an assessment score for the area of operation based on the first set of scores.

7. The media of claim 6, wherein a particular score in the first set of scores for a particular symptom in the first set of symptoms is generated based on a second set of scores generated for at least a subset of the target set of problems; wherein the subset of problems are linked to the first set of symptoms within the multilayered data model.

8. The media of claim 1, wherein the instructions further cause: identifying and presenting one or more recommended solutions to resolve at least one problem in the target set of problems; wherein said identifying and presenting is based at least in part on feedback associated with entities experiencing similar problems.

9. The media of claim 1, wherein the instructions further cause: generating a chart that identifies a severity level for at least one of a plurality of different areas of operation or a plurality of different symptoms.

10. The media of claim 1, wherein the instructions further cause: recommending or prioritizing a targeted message or action directed to addressing one or more problems in the target set of problems that potentially degrade operations of the entity.

11. The media of claim 1, wherein the instructions further cause: adding one or more contacts associated with the entity to a segment of an online campaign.

12. The media of claim 1, wherein the instructions further cause: executing an application in a blockchain network based at least in part on the score for at least one problem.

13. The media of claim 12, wherein executing the application in the blockchain network comprises: determining that an assessment or benchmark score associated with the entity satisfies a threshold; and executing a blockchain transaction responsive to determining that the assessment or benchmark score associated with the entity satisfies the threshold.

14. The media of claim 12, wherein executing the application in the blockchain network comprises: computing at least one parameter of a blockchain transaction based at least in part on the score for the at least one problem.

15. The media of claim 1, wherein the at least one machine learning model is further trained based at least in part on tracked changes in a first set of assessment scores in a set of training examples; wherein the output is based on a prediction of how the software resource affects at least one assessment score associated with the entity.

16. The media of claim 1, wherein the instructions further cause:

detecting a stage of a live conversation based on the set of information about the entity, wherein the set of information about the entity is received through a user interface for providing guidance to an individual engaged in the live conversation; traversing to a particular node within the multilayered data model based on the set of information about the entity received through the user interface; identifying sector-specific language for the stage of the live conversation based on the particular node within the multilayered data model; and presenting a recommendation through the user interface to use the sector-specific language during the live conversation.

17. The media of claim 1, wherein the instructions further cause:

receiving, by the application, feedback that indicates whether one or more operations were helpful at addressing the target set of problems; based on the feedback, modifying, by a machine-learning process, at least one link in the multilayered data model and tuning at least one weight applied by the at least one trained machine learning model for generating the score to optimize model accuracy.

18. The media of claim 1, wherein the instructions further cause: executing at least one blockchain transaction associated with accessing the software resource.

19. A system comprising:

one or more hardware processors;

one or more non-transitory computer-readable media storing instructions which, when executed by the one or more hardware processors, cause:

storing a multilayered data model that includes a first layer of nodes representing different areas of operation, a second layer of nodes representing different symptoms associated with problems that degrade one or more of the different areas of operation, and a third layer of nodes representing different root causes associated with one or more of the different symptoms, wherein each node in the first layer of nodes is linked to at least one node in the second layer of nodes, wherein each node in the second layer of nodes is linked to at least one node in the third layer of nodes;

training, by at least one computer that accesses the multilayered data model, at least one machine learning model based on input data from the multilayered data model and a selected training algorithm to generate at least one trained machine learning model, wherein training the at least one machine learning model comprises iteratively updating links between different layers of the multilayered data model and tuning model weights to minimize negative feedback;

receiving a set of information about an entity through a graphical user interface of an application that accesses the multilayered data model;

mapping by the application, the set of information about the entity to a set of nodes in the multilayered data model, wherein mapping the set of information establishes a link between the entity and at least one node in each of the first layer of nodes, the second layer of nodes, and the third layer of nodes;

determining, by the application based on said mapping, a target set of problems that potentially degrade operations of the entity;

generating, by the at least one trained machine learning model, a prediction comprising (a) a score for each problem in the target set of problems that indicates a severity of the problem for the entity and (b) an output predicting how much a software resource addressing will improve the problem;

deploying, by the application based on the score for each problem in the target set of problems and the output of the at least one trained machine learning model, the software resource predicted by the at least one trained machine learning model to address the problem having a highest severity; and tuning the at least one machine learning model to minimize negative feedback, wherein tuning the at least one machine learning model comprises updating the multilayered data model and the one or more model weights as a function of (a) the score for the problem having the highest severity, and (b) the output predicting how much the software resource will improve the problem.

20. A method comprising:

storing a multilayered data model that includes a first layer of nodes representing different areas of operation, a second layer of nodes representing different symptoms associated with problems that degrade one or more of the different areas of operation, and a third layer of nodes representing different root causes associated with one or more of the different symptoms, wherein each node in the first layer of nodes is linked to at least one node in the second layer of nodes, wherein each node in the second layer of nodes is linked to at least one node in the third layer of nodes;

training, by at least one computer that accesses the multilayered data model, at least one machine learning model based on input data from the multilayered data model and a selected training algorithm to generate at least one trained machine learning model, wherein training the at least one machine learning model comprises iteratively updating links between different layers of the multilayered data model and tuning model weights to minimize negative feedback;

receiving a set of information about an entity through a graphical user interface of an application that accesses the multilayered data model;

mapping by the application, the set of information about the entity to a set of nodes in the multilayered data model, wherein mapping the set of information establishes a link between the entity and at least one node in each of the first layer of nodes, the second layer of nodes, and the third layer of nodes;

determining, by the application based on said mapping, a target set of problems that potentially degrade operations of the entity;

generating, by the at least one trained machine learning model, a prediction comprising (a) a score for each problem in the target set of problems that indicates a severity of the problem for the entity and (b) an output predicting how much a software resource will improve the problem;

deploying, by the application based on the score for each problem in the target set of problems and the output of the at least one trained machine learning model, the software resource predicted by the at least one trained machine learning model to address the problem having a highest severity; and tuning the at least one machine learning model to minimize negative feedback, wherein tuning the at least one machine learning model comprises updating the multilayered data model and the one or more model weights as a function of (a) the score for the problem having the highest severity, and (b) the output predicting how much the software resource will improve the problem.

* * * * *